United States Patent [19]
Horie et al.

[11] Patent Number: 6,061,117
[45] Date of Patent: May 9, 2000

[54] LIQUID CRYSTAL DEVICE HAVING A POLYMER WALL ON ANOTHER WALL AND SURROUNDING A LIQUID CRYSTAL REGION AND METHOD FOR FABRICATING THE SAME

[75] Inventors: Wataru Horie, Hashimoto; Masayuki Okamoto, Tenri; Motohiro Yamahara, Osaka; Makoto Shiomi, Tenri; Nobuaki Yamada, Higashiosaka; Shuichi Kozaki, Nara, all of Japan

[73] Assignee: Sharp Kabushiki Kaisha, Osaka, Japan

[21] Appl. No.: 08/892,047

[22] Filed: Jul. 14, 1997

Related U.S. Application Data

[62] Division of application No. 08/484,983, Jun. 7, 1995, Pat. No. 5,673,092.

[30] Foreign Application Priority Data

Oct. 14, 1994 [JP] Japan ................................ 6-249595
Feb. 23, 1995 [JP] Japan ................................ 7-35759

[51] Int. Cl.[7] ..................... G02F 1/1333; G02F 1/141; G02F 1/1339
[52] U.S. Cl. ............... 349/156; 349/86; 349/92; 349/94; 349/135
[58] Field of Search ................... 349/156, 135, 349/86, 92, 94

[56] References Cited

U.S. PATENT DOCUMENTS

| 4,439,821 | 3/1984 | Grippe | 363/26 |
| 5,450,220 | 9/1995 | Onishi et al. | 359/51 |
| 5,473,450 | 12/1995 | Yamada et al. | 359/51 |
| 5,643,471 | 7/1997 | Onishi et al. | 359/53 |
| 5,673,092 | 9/1997 | Horie et al. | 349/86 |

FOREIGN PATENT DOCUMENTS

| 58-501631 | 9/1983 | Japan . |
| 61-502128 | 9/1986 | Japan . |
| 4-212928 | 8/1992 | Japan . |
| 4-338923 | 11/1992 | Japan . |
| 5-27242 | 2/1993 | Japan . |

*Primary Examiner*—William L. Sikes
*Assistant Examiner*—Julie Ngo
*Attorney, Agent, or Firm*—Dike, Bronstein, Roberts & Cushman, LLP; David G. Conlin; George W. Neuner

[57] ABSTRACT

A liquid crystal device includes a pair of electrode substrates opposing each other, a polymer wall, and a liquid crystal region surrounded by the polymer wall, the polymer wall and the liquid crystal region being sandwiched by the pair of electrode substrates. At least one of a concave portion and a convex portion is formed on a surface of at least one of the pair of electrode substrates facing the liquid crystal region, and liquid crystal molecules are oriented in the liquid crystal region axial-symmetrically around the vicinity of the at least one of concave portion and convex portion as an axis vertical to the electrode substrates.

7 Claims, 21 Drawing Sheets

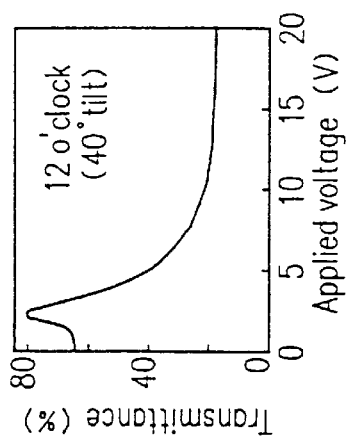
*FIG.17B*
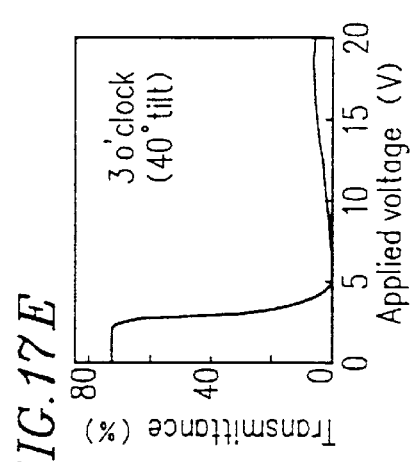
*FIG.17A*
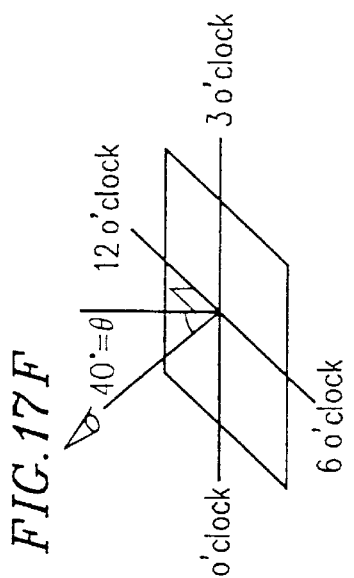
*FIG.17E*
*FIG.17F*
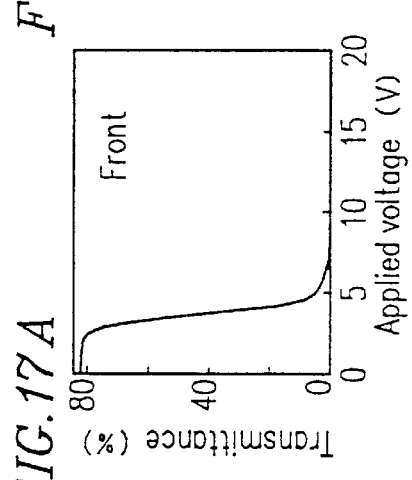
*FIG.17C*
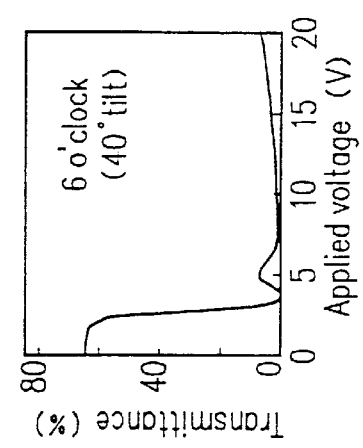
*FIG.17D*

LIQUID CRYSTAL DEVICE HAVING A POLYMER WALL ON ANOTHER WALL AND SURROUNDING A LIQUID CRYSTAL REGION AND METHOD FOR FABRICATING THE SAME

This is a divisional of application Ser. No. 08/484,983, filed on Jun. 7, 1995, now U.S. Pat. No. 5,673,092.

BACKGROUND OF THE INVENTION

1. Field of the Invention

The present invention relates to a liquid crystal device which can be used for flat displays for portable information terminals, personal computers, wordprocessors, amusement apparatuses, television sets, etc. viewed by a plurality of viewers, display boards employing a shutter effect, windows, doors, walls, or the like, and a method for fabricating the same.

2. Description of the Related Art

As Liquid crystal devices such as liquid crystal display devices employing the electro-optic effect, the twisted nematic (TN) type, the super twisted nematic (STN) type, and the like using nematic liquid crystal have already been commercialized. These types of liquid crystal devices require polarizing plates and aligning treatment. These liquid crystal devices, such as liquid crystal display devices, have a pretilt angle in an initial orientation state, so that liquid crystal molecules raise in the direction of the pretilt angle when the liquid crystal cell is applied with a voltage, as shown in FIG. 22B. Accordingly, when such a liquid crystal display device is viewed from different viewing angles A and B, the apparent refractive index of the liquid crystal molecules differs depending on the viewing angle, changing the contrast of the display or even inverting the contrast at the gray scale display level depending on the viewing angle. This significantly lowers the display quality.

On the other hand, some liquid crystal devices utilize scattering phenomena of liquid crystal, and do not use polarizing plates. These devices use a dynamic scattering (DS) effect and a phase change (PC) effect.

In recent years, a method for electrically controlling the transparent and opaque states of liquid crystal by using the birefringence of liquid crystal has been proposed. This method requires neither polarizing plates nor aligning treatment. According to this method, basically, the ordinary ray refractive index of liquid crystal molecules and the refractive index of a support medium are set identical. The transparent state is presented when the liquid crystal molecules are aligned by applying a voltage. The opaque state caused by light-scattering is presented when the liquid crystal molecules are not aligned, i.e., when no voltage is applied.

The above method is disclosed, for example, in Japanese Laid-Open National Patent Publication No. 58-501631 where liquid crystal is contained in a polymer capsule, and in Japanese Laid-Open National Patent Publication No. 61-502128 where liquid crystal and a photocurable resin or a thermosetting resin are mixed and the resin in the mixture is cured to separate the liquid crystal from the resin, thereby forming liquid crystal droplets in the resin. The liquid crystal devices obtained by these methods are called "polymer dispersed liquid crystal display devices".

Moreover, methods for improving the viewing angle characteristic of a liquid crystal cell by employing polarizing plates are disclosed in Japanese Laid-Open Patent Publication Nos. 4-338923 and 4-212928, where the above-described polymer dispersed liquid crystal display device is sandwiched between polarizing plates disposed to cross each other at right angles. This device greatly improves the viewing angle characteristic. However, since this device utilizes, in principle, depolarization caused by light scattering, the brightness of this type of device is half as low as that obtained by a TN mode device, and therefore the usability is low.

Further, another method for improving the viewing angle characteristic is disclosed in Japanese Laid-Open Patent Publication No. 5-27242, where the orientation of liquid crystal is disturbed by a polymer wall and a protrusion so as to form randomly liquid crystal domains. In this method, however, since the domains are formed randomly and a polymer material is present in pixel portions, the light transmittance at the time of no voltage application is lowered. Moreover, disclination lines randomly arise at the boundary of the liquid crystal domains and do not disappear even when a voltage is applied. This results in degradation of the black level at the time of voltage application. Due to the above reasons, the contrast of this type of the liquid crystal device is lowered.

Yet another method for improving the viewing angle characteristic is proposed by Japanese Laid-Open Patent Publication No. 6-301015 and Japanese Patent Application No. 5-199285 assigned to the same assignee of the present application, where liquid crystal molecules are aligned axial-symmetrically, for example, radially or concentrically (tangentially).

The above-described liquid crystal devices significantly improve the viewing angle characteristic, as described above. However, in these liquid crystal devices, the orientation of the liquid crystal may be disturbed due to undefined factors such as remainders of resist and scratches on the substrate. This causes the symmetry axis of the orientation of the liquid crystal molecules to incline or displace as shown in FIG. 23. This figure is a diagram of a liquid crystal device observed with a polarizing microscope. In such a case, when the liquid crystal device is viewed from different viewing angles, the area of a region of which orientation corresponds to a certain viewing direction (a black region) in one pixel becomes greater compared with other pixels. As a result, the average transmittance of the pixel differs from the transmittance of other pixels. This is observed by the viewer as roughness of display. Accordingly, in the above liquid crystal devices, the symmetry axis for the orientation of liquid crystal molecules should be strictly controlled.

Moreover, it is necessary to stabilize the axial-symmetric orientation state for easy fabrication of liquid crystal devices. The axial-symmetric orientation is mainly disturbed by the non-uniformity of surface free energy on the substrate.

SUMMARY OF THE INVENTION

The liquid crystal device of this invention includes a pair of electrode substrates opposing each other, a polymer wall, and a liquid crystal region surrounded by the polymer wall, the polymer wall and the liquid crystal region being sandwiched by the pair of electrode substrates. At least one of a concave portion and a convex portion is formed on a surface of at least one of the pair of electrode substrates facing the liquid crystal region, and liquid crystal molecules are oriented in the liquid crystal region axial-symmetrically around the vicinity of the at least one of the concave portion and the convex portion as an axis vertical to the electrode substrates.

According to another aspect of the invention, a liquid crystal device includes a pair of electrode substrates opposing each other, a polymer wall, and a liquid crystal region surrounded by the polymer wall, the polymer wall and the liquid crystal region being sandwiched by the pair of electrode substrates. A column is formed on a surface of at least one of the pair of electrode substrates facing the liquid crystal region, and liquid crystal molecules are oriented in the liquid crystal region axial-symmetrically around the vicinity of the column as an axis vertical to the electrode substrates.

According to still another aspect of the invention, a liquid crystal device includes a pair of electrode substrates opposing each other, a polymer wall, and a liquid crystal region surrounded by the polymer wall, the polymer wall and the liquid crystal region being sandwiched by the pair of electrode substrates. At least one of a concave portion and a convex portion is formed on a surface of at least one of the pair of electrode substrates facing the liquid crystal region, and liquid crystal molecules are oriented in the liquid crystal region axial-symmetrically around the vicinity of the at least one of the concave portion and the convex portion as an axis vertical to the electrode substrates. Further, a smooth resin portion is formed on a surface of one or both of the pair of electrode substrates facing the liquid crystal region.

According to still another aspect of the invention, the liquid crystal device includes a pair of electrode substrates opposing each other, a polymer wall, and a liquid crystal region surrounded by the polymer wall, the polymer wall and the liquid crystal region being sandwiched by the pair of electrode substrates. A column is formed on a surface of at least one of the pair of electrode substrates facing the liquid crystal region, and liquid crystal molecules are oriented axial-symmetrically around the vicinity of the column as an axis vertical to the electrode substrates. Further, a smooth resin portion is formed on a surface of one or both of the pair of electrode substrates facing the liquid crystal region.

In one embodiment of the invention, the smoothed electrode substrate includes a substrate for a matrix type LCD, a substrate provided with a color filter, a substrate provided with active elements, and a substrate provided with a striped electrode.

In another embodiment of the invention, a color filter is formed on at least one of the pair of electrode substrates, and concaves between color filter portions of the color filter corresponding to the liquid crystal regions are filled with a resin forming the resin portions and smoothed.

In still another embodiment of the invention, active driving elements for driving the liquid crystal by applying a driving voltage to electrodes of the electrode substrates are formed on at least one of the pair of electrode substrates, and the active driving elements and wirings thereof are covered with a resin forming the resin portions and smoothed.

In still anther embodiment of the invention, the at least one of the concave portion and the convex portion are made of a film having a vertical alignment property or a horizontal alignment property.

In still anther embodiment of the invention, the liquid crystal region is composed of a plurality of liquid crystal domains dividing a pixel, and the polymer wall is formed at the periphery of each of the plurality of liquid crystal domains.

In still another embodiment of the invention, a colored additive is included in the polymer wall.

In still anther embodiment of the invention, concaves and convexes are formed axial-symmetrically or continuously around the vicinity of a symmetry axis for the orientation of the liquid crystal molecules.

In still anther embodiment of the invention, a region where the distance between the electrodes of the pair of electrode substrates is different from the distance in other regions exists in the vicinity of the symmetry axis for the orientation of the liquid crystal molecules.

In still anther embodiment of the invention, a first wall is formed on a surface of at least one of the pair of substrates facing the liquid crystal region so as to surround the liquid crystal region or the liquid crystal domain, and a height H of the first wall and a height h of the convex portion have a relationship of H>h.

In still another embodiment of the invention, the at least one of the electrode substrates has a color filter, the color filter including a plurality of color filter portions corresponding to a plurality of pixels, and the concave portion is formed on a surface of each of the color filter portions facing the liquid crystal region.

In still another embodiment of the invention, the at least one of the electrode substrates includes convex walls formed between the plurality of color filter portions and an overcoat layer covering the plurality of color filter portions and the convex walls.

In still another embodiment of the invention, the convex walls have a light shielding property.

According to still another aspect of the invention, a liquid crystal device includes a pair of electrode substrates opposing each other, a polymer wall, and a liquid crystal region surrounded by the polymer wall, the polymer wall and the liquid crystal region being sandwiched by the pair of electrode substrates. An alignment film made of a polymer having axial-symmetric orientation axes is formed on a surface of at least one of the pair of electrode substrates facing the liquid crystal region, and liquid crystal molecules are oriented in the pixel axial-symmetrically around the vicinity of at least one of a concave portion and a convex portion as an axis vertical to the electrode substrates.

According to still another aspect of the invention, a method for fabricating a liquid crystal device, includes the steps of:

fabricating a cell by forming a first wall on at least one of a pair of electrode substrates, forming at least one of a concave portion and a convex portion at a center portion of a region surrounded by the first wall, or forming an alignment film having at least one of a concave portion and a convex portion at the center portion of the region surrounded by the first wall, and disposing the pair of electrode substrates to oppose each other;

injecting a mixture including at least liquid crystal and a curable resin into the cell; and phase-separating the liquid crystal from the curable resin by curing the curable resin at a temperature equal to or more than a homogeneously miscible temperature of the mixture.

According to still another aspect of the invention, a method for fabricating a liquid crystal device, includes the steps of:

fabricating a cell by forming a first wall on at least one of a pair of electrode substrates, forming at least one of a concave portion and a convex portion at a center portion of a region surrounded by the first wall, or forming an alignment film having at least one of a concave portion and a convex portion at the center portion of the region surrounded by the first wall, and then disposing the pair of electrode substrates to oppose each other;

injecting a mixture of at least liquid crystal and a curable resin into the cell; and phase-separating the liquid crystal from the curable resin by first heating the mixture to a homogeneously miscible temperature of the mixture and then gradually cooling the mixture, and curing the curable resin.

According to still another aspect of the invention, a method for fabricating a liquid crystal device, includes the steps of:

fabricating a cell by forming a first wall on at least one of a pair of electrode substrates and forming at least one of a concave portion and a convex portion made of a film having a vertical alignment property or a horizontal alignment property at a center portion of a region surrounded by the first wall, and disposing the pair of electrode substrates to oppose each other;

injecting a mixture of at least liquid crystal and a curable resin into the cell; and heating the mixture to a homogeneously miscible temperature of the mixture, curing the curable resin by exposing to light, and then gradually cooling the mixture.

According to still another aspect of the invention, a method for fabricating a liquid crystal device, includes the steps of:

fabricating a cell by forming a first wall on at least one of a pair of electrode substrates, forming an alignment film having axial-symmetric orientation axes by phase-separating a mixed material containing two or more different types of polymer materials in a region surrounded by the first wall, and then disposing the pair of electrode substrates to oppose each other;

injecting a mixture of at least liquid crystal and a curable resin into the cell; and curing the curable resin at a temperature equal to or more than a homogeneously miscible temperature of the mixture and phase-separating the liquid crystal from the curable resin.

According to still another aspect of the invention, a method for fabricating a liquid crystal device, includes the steps of:

fabricating a cell by forming a first wall on at least one of a pair of electrode substrates, forming an alignment film having axial-symmetric orientation axes by phase-separating a mixed material containing two or more different types of polymer materials in a region surrounded by the first wall, and then disposing the pair of electrode substrates to oppose each other;

injecting a mixture of at least liquid crystal and a curable resin into the cell; and phase-separating the liquid crystal from the curable resin by first heating the mixture to a homogeneously miscible temperature of the mixture and then gradually cooling the mixture, and curing the curable resin.

In one embodiment of the invention, the curable resin is cured while at least one of a voltage and a magnetic field is applied to the cell.

In another embodiment of the invention, active driving elements for driving the liquid crystal by applying a voltage to electrodes of the electrode substrates are formed on one of the pair of electrode substrates, and a gate driving signal voltage applied to the active driving elements at the curing of the curable resin is synchronous with a source driving signal voltage applied to the active driving elements, and the pulse width of the gate driving signal voltage is a half or less of the cycle of the source driving signal voltage.

According to another aspect of the invention, a method for fabricating a liquid crystal device includes a pair of electrode substrates opposing each other, a polymer wall, and a liquid crystal region surrounded by the polymer wall, the polymer wall and the liquid crystal region being sandwiched by the pair of electrode substrates, at least one of the pair of electrode substrates being fabricated by a method comprising the steps of:

forming a plurality of color filter portions on a surface of the substrate;

forming convex walls between the color filter portions;

forming concave portions on the surface of the plurality of color filter portions facing the liquid crystal region by forming an overcoat layer covering the plurality of color filter portions and the convex walls.

In one embodiment of the invention, the step of forming the concave portions comprises the steps of:

applying a resist covering the plurality of color filter portions; and forming the convex walls between the plurality of color filter portions by exposing the resist to light and developing.

According to the present invention, a concave portion and/or a convex portion or a column are formed on the surface of at least one of a pair of electrode substrates facing a display medium. When a mixture containing at least liquid crystal and a curable resin is injected into a space between the pair of substrates and the liquid crystal and the curable resin (polymer) are phase-separated, the liquid crystal appears at the concave portion or a liquid crystal region develops surrounding the convex portion. As a result, the liquid crystal molecules are oriented axial-symmetrically, for example, radially or concentrically, using the vicinity of the concave portion, the convex portion, or the column as a symmetry axis vertical to the substrates. Accordingly, the position of the symmetry axis can be controlled by controlling the formation of the concave portion and the convex portion, so as to obtain a uniform orientation of the liquid crystal. The "uniform orientation" as used herein refers to the state where the symmetry axis exists in each pixel in the same positional relationship and liquid crystal molecules are oriented axial-symmetrically with respect to the symmetry axis.

Further, by smoothing the surface of the other electrode substrates facing the substrate, on which the concave portion and/or the convex portion are formed, so as to eliminate a cause of disturbing the orientation of liquid crystal molecules in a liquid crystal droplet, the liquid crystal droplet can be aligned only based on the concave or convex portion described above. For example, when a color filter, which has color filter portions each corresponding to a pixel, is disposed on one of the electrode substrates, liquid crystal appears at concaves formed between color filter portions of the color filter. This is because liquid crystal tends to be separated at portions having a larger cell thickness. Therefore, the axially symmetrical orientation of the liquid crystal droplet is disturbed by the concaves between the color filter portions. This trouble can be overcome by filling the concaves with a resin to smooth the surface. Thus, the liquid crystal appears only at the convex or concave portions formed on the substrate facing the color filter portions. As another example, when active driving elements are formed on one of the electrode substrates, many steps are formed on the surface by the multilayer structure of the active driving elements and the wirings thereof. The axial-symmetric orientation of the liquid crystal molecules in the droplet may be disturbed by these steps. This trouble can also be overcome by filling the steps with a resin to smooth the surface. Thus, the liquid crystal phase appears only at the concave or convex portion described above.

The liquid crystal molecules can be aligned axial-symmetrically by forming a concave portion (of a conical shape, for example) on the surface of each color filter portion facing the liquid crystal layer corresponding to each pixel. Such a concave portion can be formed by forming a convex wall between the adjacent color filter portions and then forming an overcoat layer covering the color filter portions and the convex walls. The convex walls can be provided with a light shielding property by including a black dye and the like in the material of the convex portion. The convex portion can be formed easily by lithography by use of a photosensitive material such as a resist.

The above concave portion and/or convex portion are preferably made of a film or a material having a vertical alignment property so as to ensure the stable control of the axis for the axial-symmetric orientation.

The liquid crystal region may be covered with a single liquid crystal domain or a plurality of liquid crystal domains dividing one pixel. The polymer wall may be formed at the periphery of each liquid crystal region or at the periphery of each liquid crystal domain so as to surround the pixel or divide the pixel to form the liquid crystal domains, respectively.

The disclination line can be less visible by coloring the polymer wall by use of an additive developing a color such as black.

Concaves and convexes may be formed axial-symmetrically and/or continuously around the symmetry axis of the orientation of the liquid crystal molecules formed as described above. By this arrangement, the center or the vicinity of the center of the concaves and the convexes can be used as the axis for the axial-symmetric orientation so as to realize the orientation having the axis at the same position for all the pixels.

The above convex or concave portion may be formed on the electrode. Alternatively, the substrate itself may be deformed to have a concave or a convex and the electrode may be formed on the deformed substrate. In either case, the distance between the two electrodes on the pair of substrates at the portion where the concave or convex is formed becomes different from the other portions. An alignment film may also be formed on the deformed substrate having a concave or a convex to obtain an alignment film with a concave or a convex. These are effective in stabilizing the orientation of the liquid crystal molecules.

A first wall which has a different surface tension from the other region may be formed on the surface of at least one of the pair of substrates facing the display medium. By forming the first wall, the axial-symmetric orientation of the liquid crystal molecules can be stabilized without using a photoresist. In this case, if the height of the convex portion is larger than that of the first wall, a polymer column may be formed on the convex portion, resulting in disturbing the orientation of the liquid crystal molecules.

The mixture containing at least the liquid crystal and the curable resin may be phase-separated by curing the curable resin at a temperature equal to or more than the temperature at which they are homogeneously miscible with each other (hereinafter, such a temperature is referred to as a "homogeneously miscible temperature"). Alternatively, the mixture may be heated to the homogeneously miscible temperature and then gradually cooled so as to allow the liquid crystal and the curable resin to be phase-separated and then the curable resin to be cured.

A voltage and/or a magnetic field may be applied to the cell at the time of phase separation, so that the symmetry axis for the orientation of the liquid crystal molecules can be made vertical to the substrates.

An alignment film made of a polymer film having axial-symmetric orientation axes is formed on the surface of at least one of the pair of substrates facing the display medium. The orientation axes of the liquid crystal molecules are substantially identical to the orientation axes of the polymer of the alignment film. Accordingly, the liquid crystal can be aligned axial-symmetrically, for example, radially or concentrically, around the axis vertical to the substrates as the symmetry axis.

The above alignment film can be formed by phase-separating a mixed material containing two or more different types of polymer materials in the region surrounded by the first wall.

Further, the signal voltage for driving the gate of the active driving element may be synchronous with the signal voltage for driving the source thereof, the pulse width of the former may be a half or less of the cycle of the latter, and the resin may be cured while the voltage is applied. Accordingly, the potential difference between the pixel electrode and the gate line formed on the same substrate is decreased, and such a trouble that the axially symmetrical orientation of the liquid crystal molecules is disturbed due to the potential at the gate line can be overcome.

Thus, the invention described herein makes possible the advantages of (1) providing a liquid crystal device capable of improving the viewing angle dependency by realizing the axial-symmetric orientation of liquid crystal molecules and capable of reducing the roughness of display by controlling the axis for the axial-symmetric orientation, and (2) providing a method for fabricating such a liquid crystal device.

These and other advantages of the present invention will become apparent to those skilled in the art upon reading and understanding the following detailed description with reference to the accompanying figures.

BRIEF DESCRIPTION OF THE DRAWINGS

FIGS. 17A to 17F show the electro-optic characteristics of the liquid crystal display device of Comparative Example 1.

DESCRIPTION OF THE PREFERRED EMBODIMENTS

The present invention is described by way of examples as follows.

Figure 1:
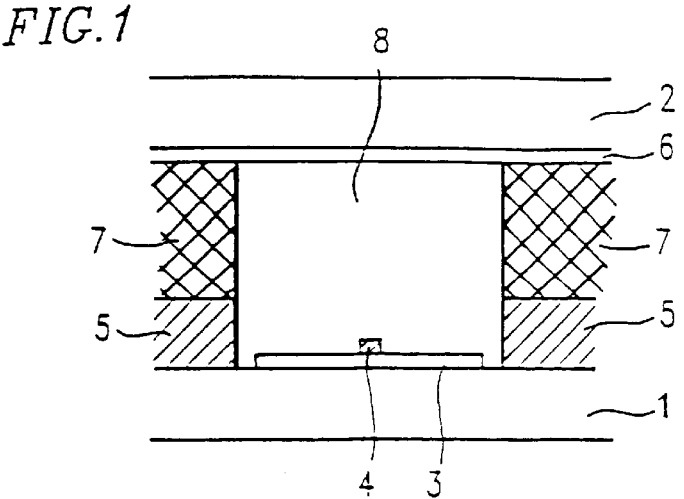
FIG. 1 is a sectional view showing a liquid crystal display device according to the present invention.

FIG. 1 is a sectional view showing one pixel portion of a liquid crystal display device according to the present invention.

Referring to FIG. 1, a pixel electrode 3 made of indium tin oxide (ITO) or the like is formed on a transparent substrate 1 made of glass or the like. A convex portion 4 made of a resist or the like is formed at the center of the pixel electrode 3, and a first wall 5 made of a resist or the like is formed to surround the pixel. A counter electrode 6 made of ITO or the like is formed on another transparent substrate 2 made of glass and the like.

Figure 2:
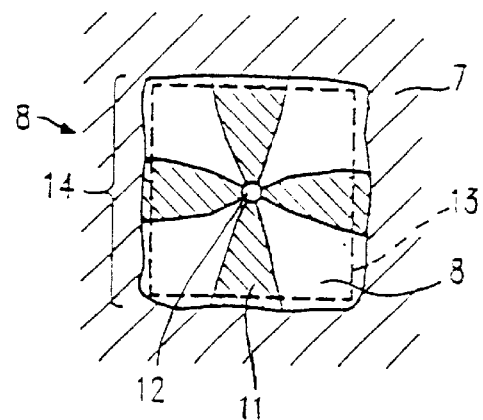
FIG. 2 is a diagram of a liquid crystal display device according to the present invention observed with a polarizing microscope.

As shown in FIG. 2, a liquid crystal region 8 surrounded by a polymer wall 7 is formed between the transparent substrates 1 and 2 for each pixel. Liquid crystal molecules in the liquid crystal region 8 (in each pixel) are aligned radially around the vicinity of the convex portion 4 as the axis vertical to the substrates 1 and 2, achieving a uniform orientation state.

As described above, the liquid crystal molecules are intentionally aligned around the convex portion 4 axial-symmetrically (for example, radially, concentrically, and swirlingly) in the liquid crystal region 8. Also, the liquid crystal region 8 is substantially a mono-domain region. With this arrangement, the viewing angle characteristic can be improved and the roughness of display, especially at the gray scale level, can be reduced.

(Orientation state of liquid crystal molecules in the domain)

When the liquid crystal display device of this example is observed with a polarizing microscope, a cross-shaped extinction pattern 11 is observed in the liquid crystal region 8 surrounded by the polymer wall 7 in a direction of the polarizing axis of polarizing plates, as shown in FIG. 2. This indicates that the liquid crystal molecules are aligned around a center disclination point 12 at the center of the liquid crystal region 8 axial-symmetrically (for example, radially, concentrically, and swirlingly) and that the liquid crystal region 8 is a mono-domain region.

In the liquid crystal display device in the above orientation state, a disclination line (not shown in FIG. 2) is formed outside a liquid crystal domain 14 at the time of voltage application, but will never be formed inside the liquid crystal domain 14. Accordingly, it is possible to intentionally form a disclination line outside the pixel. Further, the disclination line or the disclination point may be formed under a light-shielding layer so as to improve the black level of the liquid crystal display device and thereby to improve the contrast of the display. In this case, the disclination line may be made less visible by adding an additive developing a color (black, for example) to the material of the polymer wall 7, or to the material of the convex portion 4 and the first wall 5. Alternatively, an orientation state where no disclination line arises can be obtained by adding a liquid crystalline polymerizable material to the polymer wall 7.

Figure 22A:
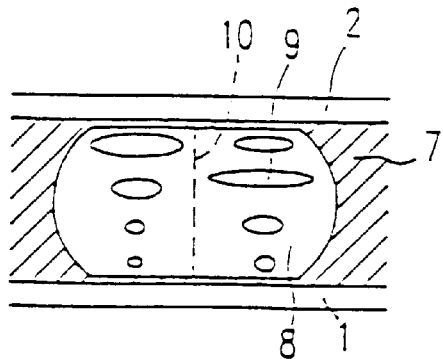
FIGS. 22A to 22C and FIGS. 22D to 22F are diagrams for explaining the change in the contrast depending on the viewing angle for liquid crystal display devices in a wide viewing angle mode and a TN mode, respectively.
Figure 22D:
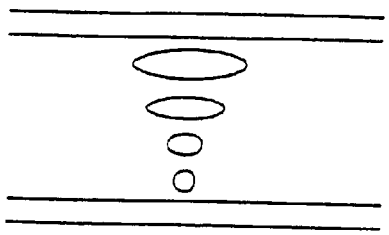
Figure 22B:
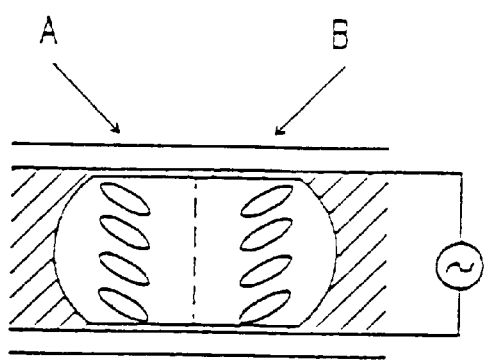
Figure 22E:
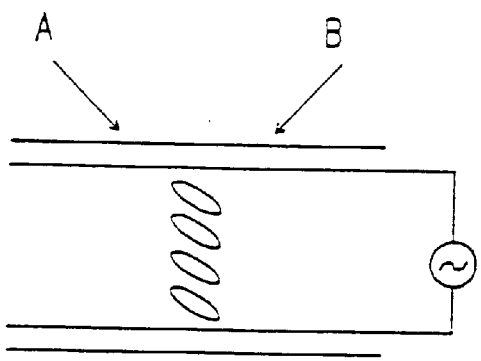
Figure 22C:
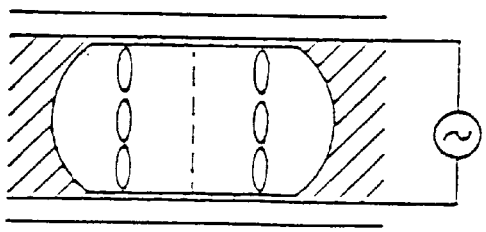
Figure 22F:
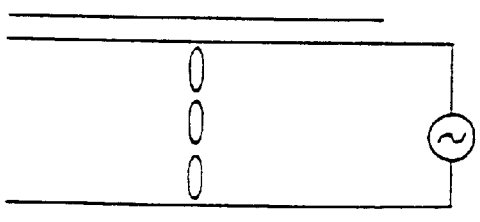
Figure 23:
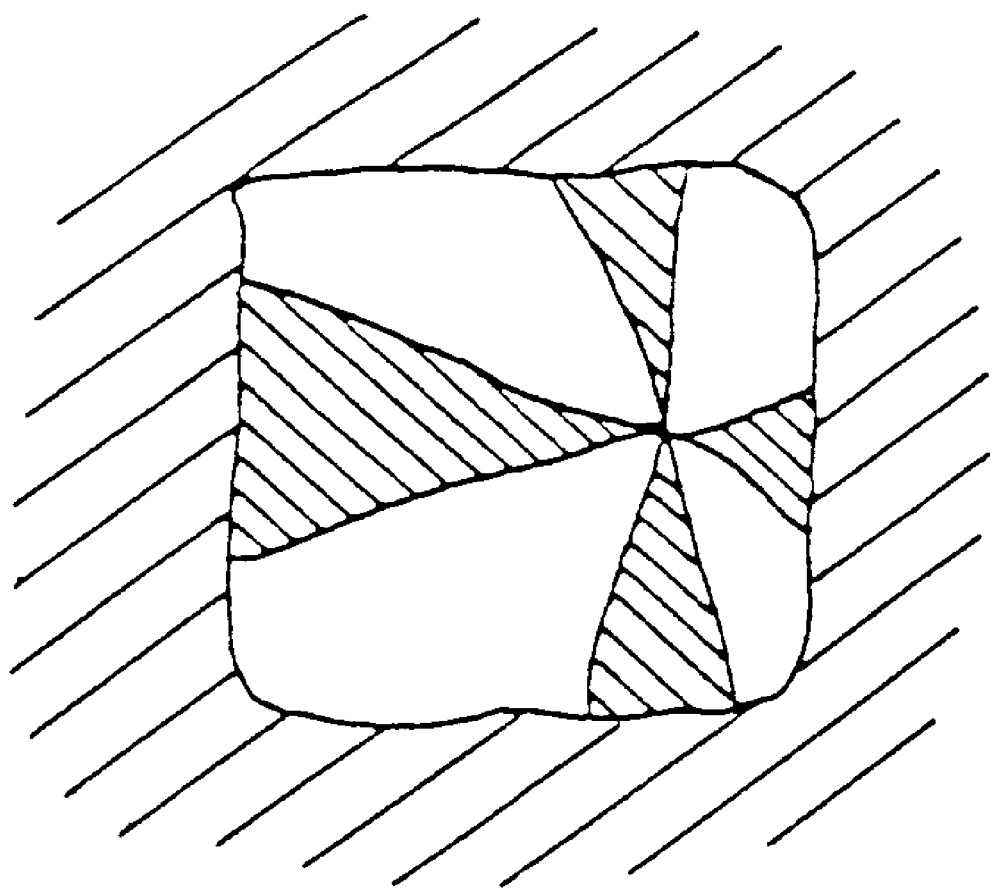
FIG. 23 is a diagram for explaining the roughness of a display due to the displacement of the orientation axis of liquid crystal molecules.

When a display voltage is applied to the liquid crystal device having the above orientation state, liquid crystal molecules 9 rise so as to be vertical to the substrates 1 and 2, as shown in FIGS. 22A to 22C, for example. At this time, the liquid crystal molecules 9 rise at the respective positions of the initial radial or concentric orientation. Accordingly, the apparent refractive indexes viewed in various directions are made uniform, and thus the viewing angle characteristic of the liquid crystal device can be improved.

(The number of domains in one pixel)

The number of domains in each pixel is preferably as small as possible. If a number of domains exist in one pixel, a disclination line arises at each boundary of the domains, causing a degradation in the black level of the display. It is preferable, therefore, that the pixel 13 is covered by a single domain where liquid crystal molecules are aligned axial-symmetrically in the liquid crystal region 8. With this arrangement, since the disclination line is formed outside the domain at the time of voltage application, the disclination line seldom intrudes inside the pixel 13.

Figure 3:
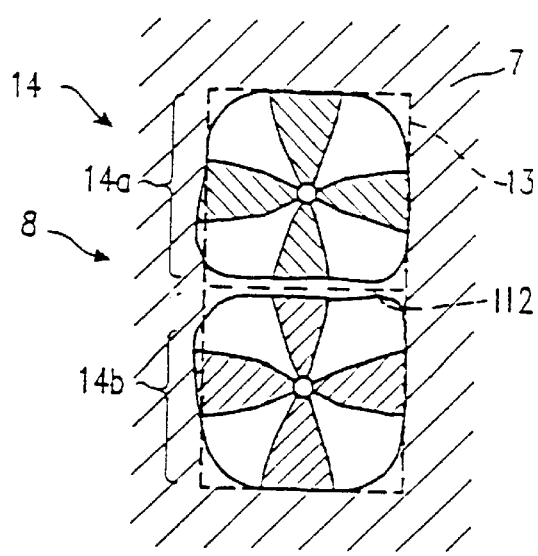
FIG. 3 is a diagram of another liquid crystal display device according to the present invention observed with a polarizing microscope.

In the case where the pixel 13 is rectangular, as shown in FIG. 3, the liquid crystal region 8 may have two or more domains 14 each having liquid crystal molecules aligned axial-symmetrically. Such a liquid crystal display device can also have the same excellent viewing angle characteristic as the liquid crystal display device having the mono-domain liquid crystal region 8 as shown in FIG. 2. In the case of the liquid crystal display device shown in FIG. 3, the rectangular pixel 13 may be divided into two by forming a wall like the polymer wall 7 and the first wall 5 therebetween.

Further, in the liquid crystal display device shown in FIG. 3, the direction of the disclination line 112 formed at the boundary of the domains 14a and 14b in the pixel 13 may be made identical to the polarizing axis of the polarizing plates, so that the disclination line can be less visible at the time of voltage application.

Alternatively, it may be possible to form a black mask (BM) within a pixel so as to hide the disclination line formed at the boundary of the domains 14a and 14b in the pixel 13.

When the pixel is divided into a plurality of liquid crystal regions 8, or liquid crystal domains 14 as described above, it is required to align the orientation axis of the liquid crystal molecules in each liquid crystal region 8 or liquid crystal domain 14.

(Method 1 for uniformly aligning liquid crystal molecules axial-symmetrically)

By forming a concave or convex portion or both thereof on at least one of the pair of substrates, the liquid crystal molecules can be aligned axial-symmetrically and the position of the symmetry axis is controlled.

According to this method, the first wall 5 is first formed by patterning, and a concave or convex portion or both thereof is formed at substantially the center of a region surrounded by the first wall so as to form a portion having a different cell gap in the region. A mixture containing at least liquid crystal and a curable resin is injected into the cell. When there exists a portion having a cell gap different from that of the other portions (excluding the first wall 5 surrounding the pixel), which is to serve as the symmetry axis in the pixel, the liquid crystal and the curable resin (or polymer) are phase-separated to separate the liquid crystal from the curable resin by a polymerization reaction or temperature drop. How the liquid crystal is separated differs depending on the cases described below.

(1) In the case where the cell gap of the portion which serves as the symmetry axis in the pixel at phase separation is small (when the convex portion is formed):

When the liquid crystal and the curable resin (or polymer) are phase-separated by a polymerization reaction or temperature drop, the convex portion 4 on the substrate 1 as shown in FIG. 1 serves as a nucleus for the separation of the liquid crystal, and the liquid crystal region 8 develops surrounding the vicinity of the convex portion 4. As a result, the liquid crystal molecules are aligned radially or concentrically around the axis vertical to the substrates, so as to obtain the axial-symmetric orientation of the liquid crystal molecules. Simultaneously, the symmetry axis and the convex portion 4 can be made identical. This indicates that the position of the symmetry axis for the alignment of the liquid crystal molecules can be controlled by controlling the position of the convex portion 4, and that the liquid crystal molecules can be aligned axial-symmetrically in the pixel.

The height of the convex portion 4 is preferably a half or less of the cell gap and smaller than the height of the first wall 5 formed outside the pixel 13 to surround the pixel region. If the convex portion 4 is too high, a polymer pillar is formed on the convex portion 4. If the polymer pillar is too high, the orientation state may be disturbed by the polymer pillar.

The convex portion 4 should have a size appropriate to serve as the nucleus for the separation of the liquid crystal. The size is preferably as small as possible. For example, it is 30 μm or less. If the convex portion 4 is too large, a polymer pillar is formed on the convex portion 4. This results in voltage drop which is a cause of the reduction of the contrast.

Figure 4A:
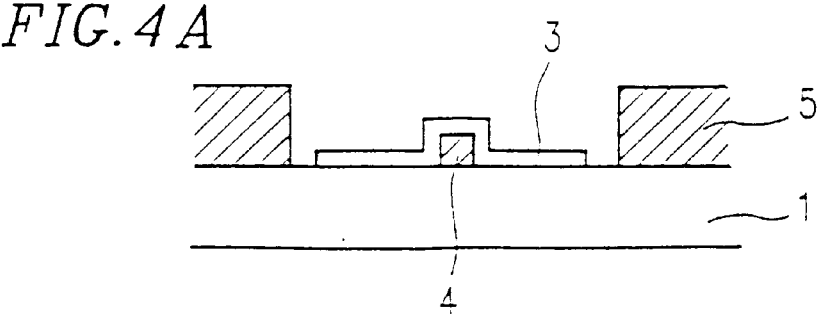
FIGS. 4A and 4B are sectional views showing other liquid crystal display devices according to the present invention.
Figure 4B:
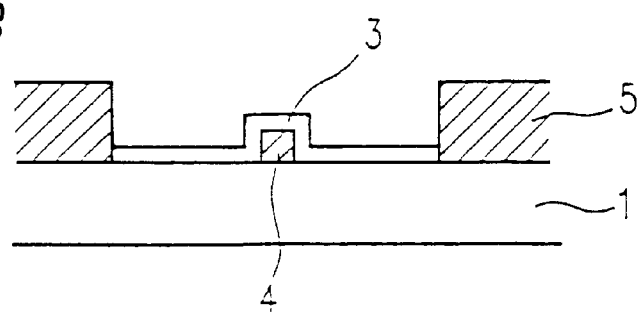
Figure 5:
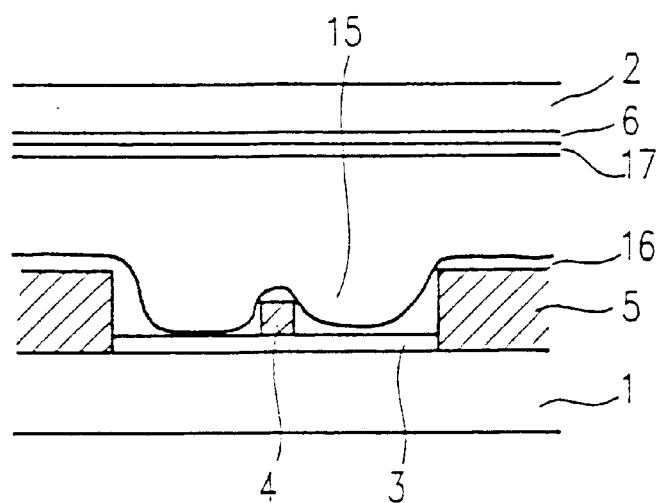
FIG. 5 is a sectional view of the liquid crystal cell of Example 4.

The convex portion 4 may be made of organic materials such as a resist and inorganic materials such as $SiO_2$, $Al_2O_3$, and ITO, though not specified in the present invention. When a resist material is used, the convex portion 4 can be easily formed. When ITO which is transparent and conductive is used, as shown in FIGS. 4A and 4B, the convex portion can be formed by forming the pixel electrode 3, made of ITO, over the substrate 1 on which the convex portion 4 has already been formed. Alternatively, as shown in FIG. 5, an alignment film 16 may be formed over the substrate 1 on which the convex portion 4 has already been formed. In order to place such a convex portion (the convex portion 4 covered with the pixel electrode or the alignment film 17) at the center of the axis for the alignment of the liquid crystal, it is preferable to use a material having a vertical alignment property. A resist material with F-based or Si-based additives added thereto, for example, can be used as such a material. In particular, a material having a surface free energy of 35 mN/m or less is preferable. Further, the orientation stability can be increased in some cases when the first wall 5 formed surrounding the pixel and the convex portion are made of different materials.

Figure 6:
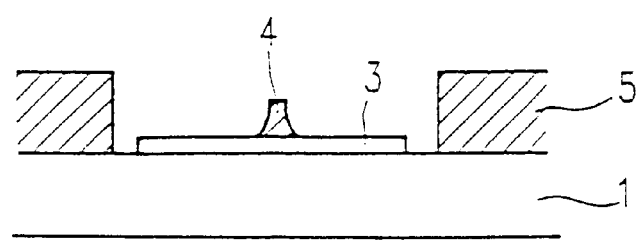
FIG. 6 is a sectional view of yet another liquid crystal display device according to the present invention.

The convex portion 4 may have a shape of a circle, a square, a rectangle, an oval, a star, a cross, or the like, though the shape is not specified in the present invention. The convex portion 4 does not necessarily have the same size in the vertical direction, but may be tapered as shown in FIG. 6.

Figure 7:
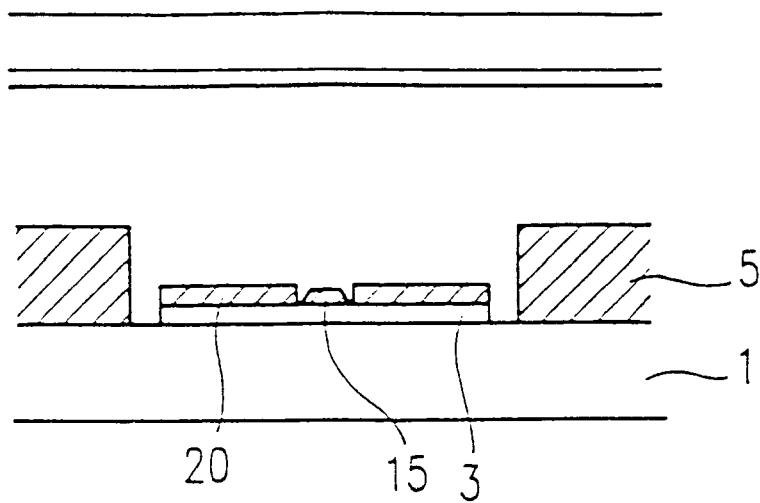
FIG. 7 is a sectional view of yet another liquid crystal display device according to the present invention.

(2) In the case where the cell gap of the portion which serves as the symmetry axis in the pixel at phase separation is large (when a concave portion is formed):

When the liquid crystal and the curable resin (or polymer) are phase-separated by polymerization reaction or temperature drop (especially, by temperature drop), if a concave portion 15 is formed on the substrate 1 as shown in FIG. 7, the liquid crystal phase-separated from the curable resin forms a sphere having the minimum surface tension at the concave portion 15 and is stabilized. As a result, the liquid crystal appears at the concave portion 15 and the liquid crystal region 8 develops surrounding the concave portion 15. Accordingly, the liquid crystal molecules are aligned radially or concentrically around an axis vertical to the substrates, so as to obtain the axial-symmetric orientation of the liquid crystal molecules axial-symmetrically. Simultaneously, the symmetry axis and the concave portion 15 can be made identical. This indicates that the position of the symmetry axis for the alignment of the liquid crystal molecules can be controlled by controlling the position of the concave portion 15, and that the liquid crystal can be aligned axial-symmetrically in the pixel.

The depth of the concave portion 15 is not specified in the present invention. However, when an organic material such as a resist 20 is used, the depth is preferably as small as possible because the smaller the depth, the smaller the voltage drop which may cause lowering of the contrast.

The size of the concave portion 15 is preferably large. However, to some extent, the size depends on the size of the pixel. Preferably, it is approximately 40% of the area of the pixel.

The concave portion 15 may be made of an organic material, such as a resist 20, or an inorganic material such as $SiO_2$, $Al_2O_3$, and ITO, though not specified in the present invention.

Figure 8:
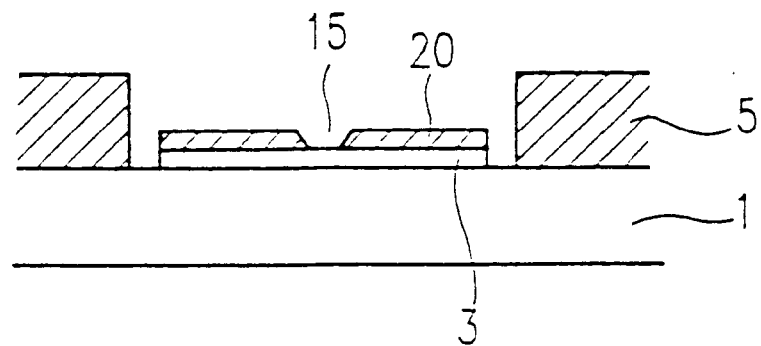
FIG. 8 is a sectional view of yet another liquid crystal display device according to the present invention.

The concave portion 15 may have a shape of a circle, a square, a rectangle, an oval, a star, a cross, or the like, though the shape is not specified in the present invention. The concave portion 15 does not necessarily have the same size in the vertical direction, but may be tapered as shown in FIG. 8.

(3) In the case where both portions having a large cell gap and a small cell gap are formed in the pixel (when both the concave and convex portions are formed):

When the liquid crystal and the curable resin (or polymer) are phase-separated by polymerization reaction or temperature drop, if both the convex portion 4 and the concave portion 15 exist on the substrate 1, the liquid crystal is separated at the concave portion 15 and the liquid crystal region 8 develops surrounding the convex portion 4 at the center of the pixel. Accordingly, by using the convex portion 4 as the symmetry axis, the position of symmetry axis can be fixed for all the pixels, and thus the roughness of display can be reduced.

Figure 9:
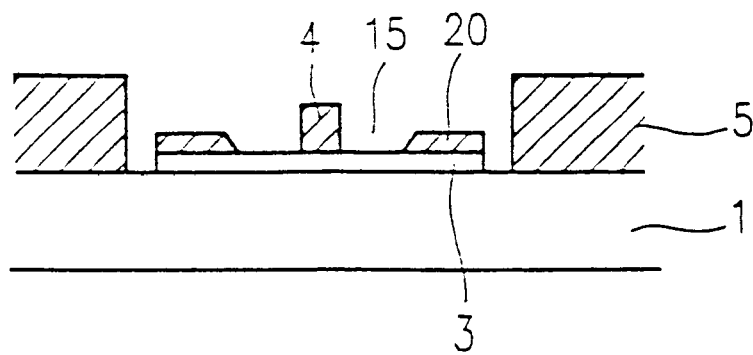
FIG. 9 is a sectional view of yet another liquid crystal display device according to the present invention.

The convex and concave portions may be formed axial-symmetrically as shown in FIG. 9 or formed continuously as shown in FIG. 5.

The heights of the surfaces of the concave portion 15 and the convex portion 4 may be the same as that of the flat smooth surface, or they may be different.

Figure 10A:
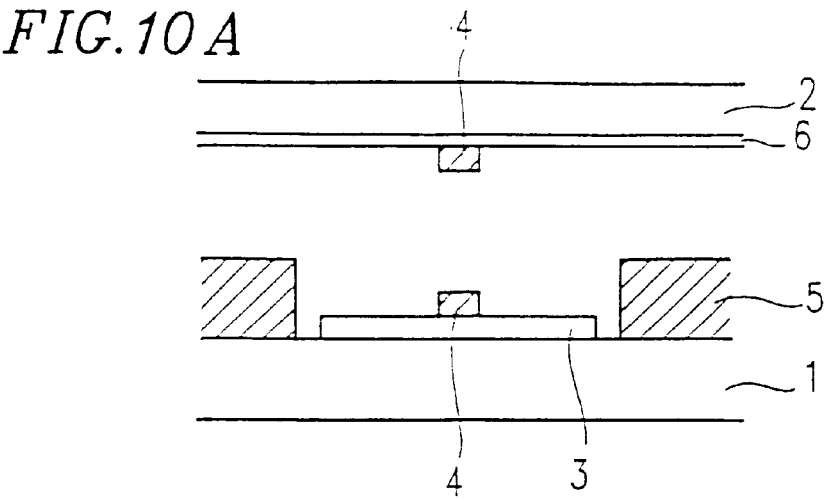
FIGS. 10A and 10B are sectional views of other liquid crystal display devices according to the present invention.
Figure 10B:
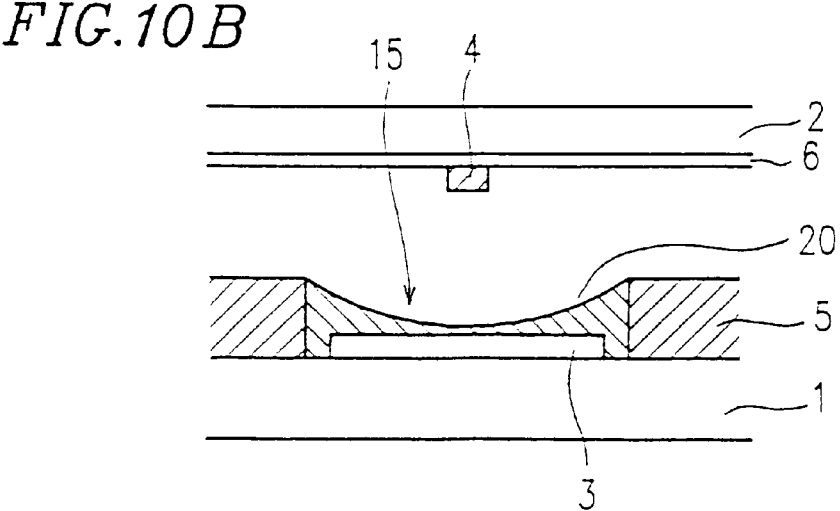

(4) In the case where the convex portion and/or concave portion are formed on the two substrates:

In the above cases (1) to (3), at least the concave portion 15 or the convex portion 4, among the concave portion 15, the convex porion 4, and the first wall 5, is formed on one of the pair of substrates. However, as shown in FIGS. 10A and 10B, the first wall 5 may be formed on the substrate 1, while the concave portion 15 or the convex portion 4 may be formed on the substrate 2 or on both substrates 1 and 2.

Figure 11:
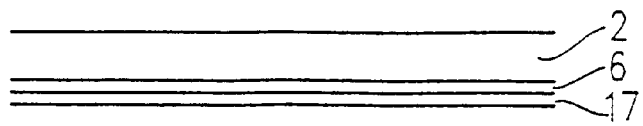
FIG. 11 is a sectional view of the liquid crystal cell of Example 1.
Figure 11:
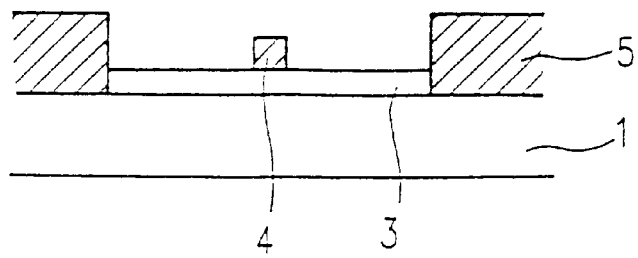
Figure 12:
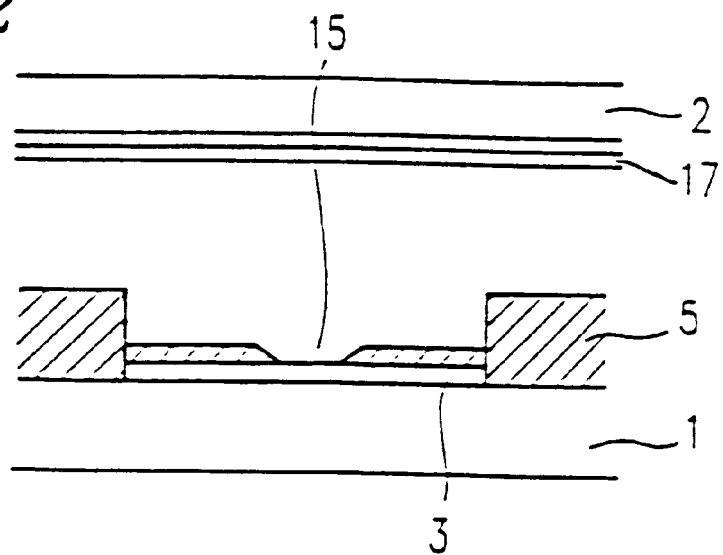
FIG. 12 is a sectional view of the liquid crystal cell of Example 2.

When at least one of the concave portion 15 and the convex portion 4 is formed on the substrate 1, an alignment film 17 may be formed on the other substrate, i.e., the counter substrate 2, as shown in FIGS. 5, 11, and 12. The alignment film 17 on the counter substrate 2 serves to smooth a roughness on the counter substrate 2 or a passivation film (not shown) or make the surface energy uniform. Thus, at the phase-separation of the liquid crystal from the curable resin (or polymer), the liquid crystal is prevented from separating at positions other than the above-described concave portion and convex portion.

(5) In the case where a color filter is formed on the counter substrate:

The case where a color filter having a plurality of color filter portions each corresponding to a pixel is formed on the surface of the counter substrate opposing the substrate on which the concave or convex portion is formed will be described. The color filter has concave portions between adjacent filter portions corresponding to pixels. At the phase-separation of the liquid crystal from the curable resin (or polymer), the liquid crystal separates at portions having a large cell thickness as described hereinbefore. Accordingly, the liquid crystal tends to separate at the concaves formed between adjacent filter portions, and therefore the axial-symmetric orientation of the liquid crystal molecules in the droplet cannot be obtained. This problem can be overcome by filling these concaves with a resist resin to smooth the surface of the color filter. Thus, since the cause of disturbance of the orientation of the liquid crystal molecules in the droplet can be eliminated, it is possible for the liquid crystal to appear only at the concave portion or the convex portion formed on the substrate opposing the color filter at the phase-separation of the liquid crystal from the curable resin (or polymer).

(6) In the case where active driving elements are formed on the counter substrate:

The case where active driving elements are formed on the smoothed electrode substrate will be described. Since the active driving elements and wirings thereof are multi-layered, many steps are formed. These steps may disturb the axial-symmetric orientation of the liquid crystal molecules. However, this problem can be overcome by filling the steps with a resin to smooth the surface. Thus, it is possible for the liquid crystal to appear only at the concave portion or the convex portion.

(Method for forming the concave portion, the convex portion, and the first wall)

The concave portion, the convex portion, and the first wall can be formed by the following methods.

Figure 13A:
FIGS. 13A to 13C are sectional views showing the fabrication process of one substrate of the liquid crystal display device of FIG. 3.
Figure 13B:
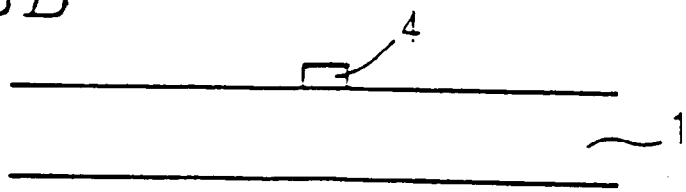
Figure 13C:
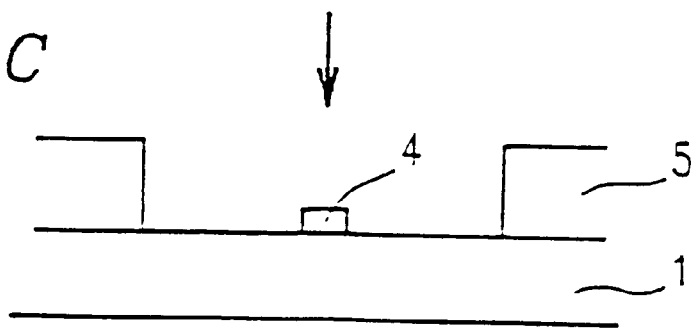

(1) Using resist material:

The case where the substrate 1 having the convex portion 4 as shown in FIG. 1 will be described with reference to FIGS. 13A to 13C. First, a resist is applied to the substrate 1 shown in FIG. 13A and exposed to light and developed to form the convex portion 4 at the center of the pixel as shown in FIG. 13B. Then, another resist is applied, exposed to light, and developed to form the first wall 5 surrounding the pixel as shown in FIG. 13C. The convex portion 4 and the first wall 5 may be made of the same material. The same process can be employed for the formation of the concave portion.

A material for an alignment film or a resist material may be applied to the substrate 1 after the formation of the first wall 5 and solidified. The resultant alignment film or the resist has a thicker portion in the vicinity of the first wall 5. As a result, as shown in FIG. 10B, a conical concave portion 15 is obtained which is deepest at the center of the pixel and becomes increasingly shallower as it approaches the first wall 5.

(2) Processing the substrate itself:

When a plastic substrate is employed, it is possible to roughen the substrate itself by embossing or the like so as to form the concave portion, the convex portion, or the first wall. A transparent electrode or an alignment film may be formed on the substrate having the concave portion or the convex portion, as shown in FIGS. 4A, 4B, and 5.

(3) Using inorganic material:

An inorganic material such as $SiO_2$, $Al_2O_3$, and ITO is deposited on the substrate and patterned by use of a mask, so as to form the concave portion, the convex portion, or the first wall.

(Method for forming the substrate having a color filter opposing the substrate having the concave or convex portion)

Figure 24:
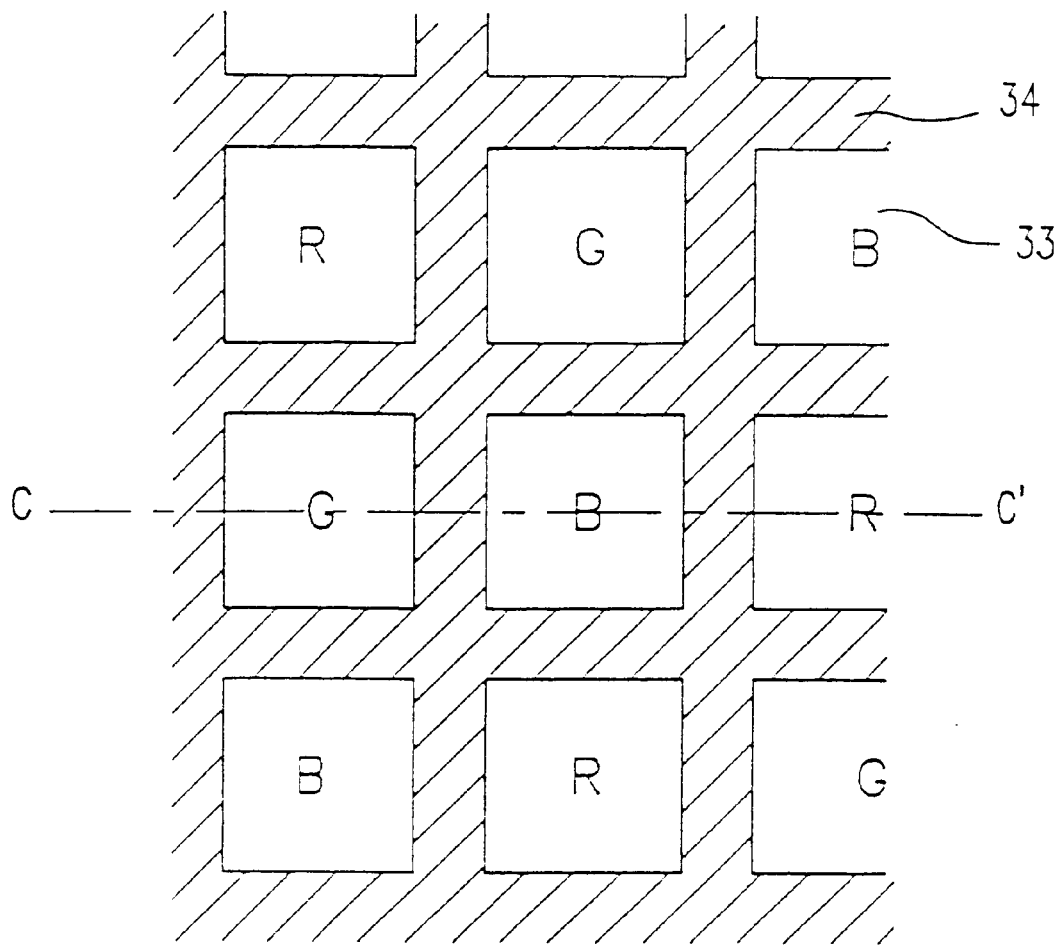
FIG. 24 is a plan view showing a resist pattern formed on a color filter substrate according to the present invention.
Figure 25:
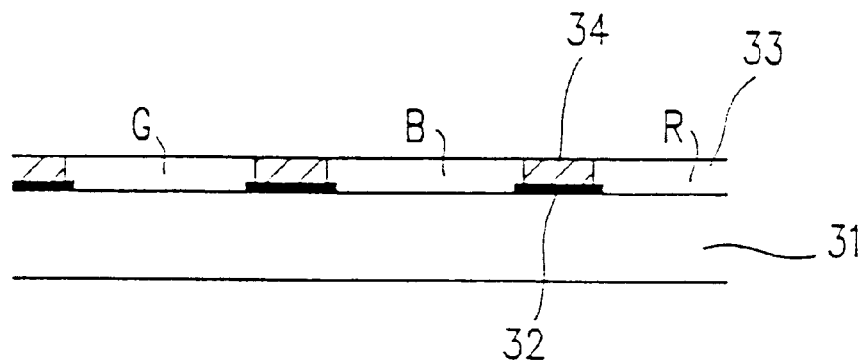
FIG. 25 is a sectional view taken along line C-C' of FIG. 24.

FIG. 24 is a plan view showing a resist pattern formed on the substrate on which the color filter is formed (hereinafter, such a substrate is referred to as the color filter substrate) according to the present invention. FIG. 25 is a sectional view taken along line C-C' of FIG. 24. Referring to FIGS. 24 and 25, a material for a light shielding film 32 is deposited on a glass substrate 31 and patterned so as to etch the material on portions corresponding to pixel regions, thereby forming light transmitting portions. The other portions of the material which do not correspond to the pixel regions are not etched to form the light shielding films 32. R, G, and B color filter portions 33 are then formed on the light transmitting portions. A resist resin is applied to the color filter substrate having the color filter portions 33 and the resist resin deposited on the color filter portions 33 are removed, so as to form resist resin portions 34 on the respective light shielding films 32. In this way, the concaves between the adjacent color filter portions 33 can be filled with the resist resin portions 34 to smooth the surface of the color filter substrate. By this smoothing, the cause of disturbance of the axial-symmetric orientation of the liquid crystal molecules in the droplet can be eliminated, and the liquid crystal can be separated only at the concave or convex portion disposed on the opposing substrate.

(Material for the concave portion and/or convex portion)

A general photoresist material can be used as the resist material. Since the concave portion 15, the convex portion 4, and the first wall 5 remain in the cell, it is preferable to use photosensitive polyimide which is excellent in thermal resistance. When a resist material is used, liquid crystal material tends to remain on the resist in the pixel (the periphery 20 of the concave portion 15 and the convex portion 4 in FIG. 9, for example), thereby lowering the contrast. Accordingly, a resist material having the light shielding property is preferable. For example, a color resist where a coloring matter is contained in a resist material can be used.

Figure 26:
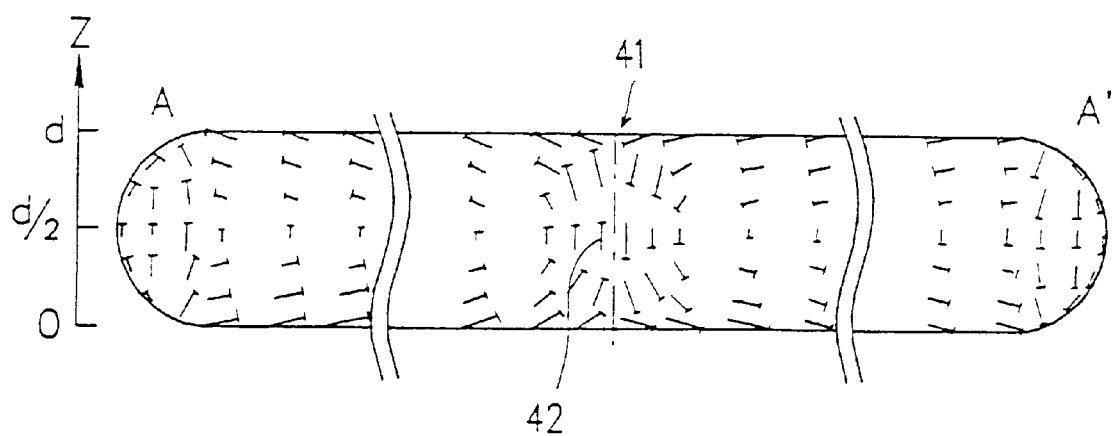
FIG. 26 is a sectional view showing an axial-symmetric orientation model at the mode according to the present invention.

It is observed from an axial-symmetric orientation model shown in FIG. 26 that liquid crystal molecules 42 are oriented vertically in the vicinity of a symmetry axis 41 for axial symmetry. From this fact, in order to facilitate the axial-symmetric orientation of liquid crystal molecules, it is suggested that the liquid crystal molecules in the vicinity of the center of the pixel should be positively aligned in the vertical direction. It is then suggested that the concave portion 15 or the convex portion 4 should be formed of a material having a vertical alignment property. As such a material having the vertical alignment property, an organic material such as polyimide having the vertical alignment property provided with photosensitivity, an obliquely deposited inorganic film made of a material such as $SiO_2$, and the like can be used. Alternatively, a vertical alignment film may be first formed on the substrate and then covered with a horizontal alignment film except for the portion corresponding to the center of the pixel, thus exposing the vertical alignment film only at the center of the pixel.

(Method 2 for uniformly aligning liquid crystal molecules axial-symmetrically)

Figure 14A:
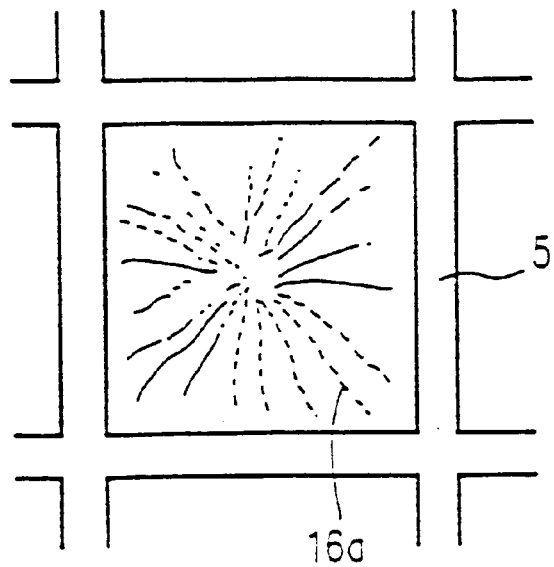
FIG. 14A is a plan view showing the liquid crystal cell of Example 6.

An alignment film 16a made of a polymer having axial-symmetric orientation axes as shown in FIG. 14A may be formed on one of the substrates. With this arrangement, the liquid crystal molecules can be aligned axial-symmetrically with the orientation axes of the liquid crystal molecules being substantially identical to the orientation axes of the alignment film 16a.

(Method for forming the axial-symmetric alignment film)

Figure 14B:
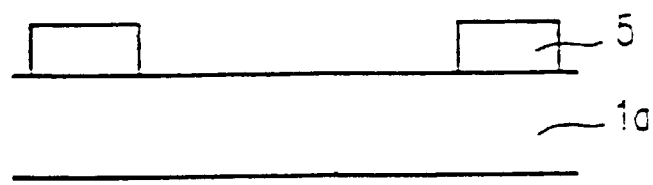
FIGS. 14B to 14D are sectional views of the fabrication process of a liquid crystal cell according to the present invention.
Figure 14C:
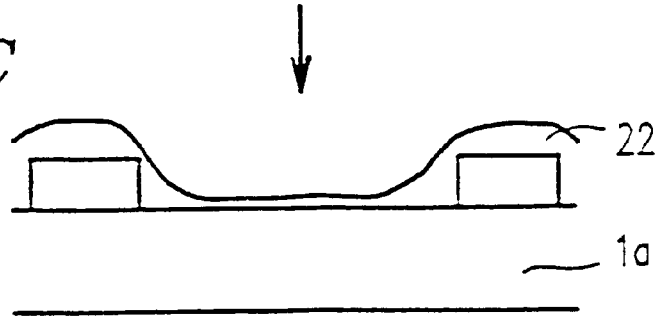
Figure 14D:
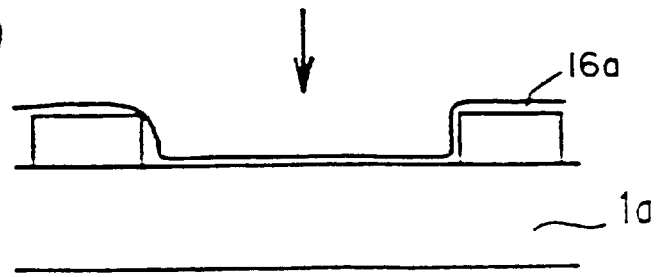

Referring to FIGS. 14B to 14D, after formation of the first wall 5, a mixed material containing two different polymer materials is applied to a substrate 1a. Two polymer materials in the mixture are then phase-separated axial-symmetrically, i.e., radially, concentrically, or the like, so as to form the alignment film having the axial-symmetric orientation axes.

A cell is formed by use of the substrate 1a having the axial-symmetric alignment film, and a mixture of liquid crystal and a curable resin (or polymer) is injected into the cell. Then, the mixture is subjected to polymerization or a temperature drop so as to phase-separate the liquid crystal from the curable resin. As a result, the liquid crystal molecules are aligned axial-symmetrically, with the orientation axes of the liquid crystal molecules being substantially identical to the orientation axes of the alignment film 16a.

(Method for forming the polymer wall)

The liquid crystal region surrounded by the polymer wall is formed in the following manner:

(1) A mixture containing at least liquid crystal and a curable resin is injected into the cell and cured at a temperature exceeding the homogeneously miscible temperature of the mixture. Then, the liquid crystal and the curable resin (polymer) are phase-separated, so as to form the liquid crystal region surrounded by the polymer wall.

(2) A mixture containing at least liquid crystal and a curable resin is injected into the cell. The mixture is heated to or above the homogeneously miscible temperature of the mixture and then gradually cooled, so as to phase-separate the liquid crystal from the curable resin. Thereafter, the curable resin is cured so as to form the liquid crystal region surrounded by the polymer wall.

In the above methods (1) and (2), if a photocurable resin is used, the resin can be cured by irradiation with ultraviolet light (or visible light).

In either case, since the concave portion, the convex portion, or the alignment film has been formed, the positions where the liquid crystal appears and the positions where the liquid crystal region and the polymer wall are formed can be controlled without the necessity of producing an irradiation intensity distribution by a photomask.

(Method for controlling the alignment by polymer material)

(1) Addition of polymerizable liquid crystalline material:

In order to effectively align liquid crystal molecules in an orientation direction at the time of voltage application, it is preferable to add a polymerizable liquid crystalline material such as a liquid crystalline photocurable resin which includes a functional group exhibiting the liquid crystallinity or a similar functional group in a molecule to the mixture of the liquid crystal and the curable resin. Moreover, when the liquid crystal in the mixture is phase-separated from the curable resin in the cell, the curable resin may be formed, in some cases, on an island such as the convex portion made of a material having the vertical alignment property, blocking the effect of the vertical alignment property. Therefore, it is preferable to add a curable resin having a functional group which is likely to exhibit liquid crystallinity in the curable resin so that the vertical alignment property of the island can be transmitted to the liquid crystal phase even if the curable resin is formed on the island.

Figure 15:
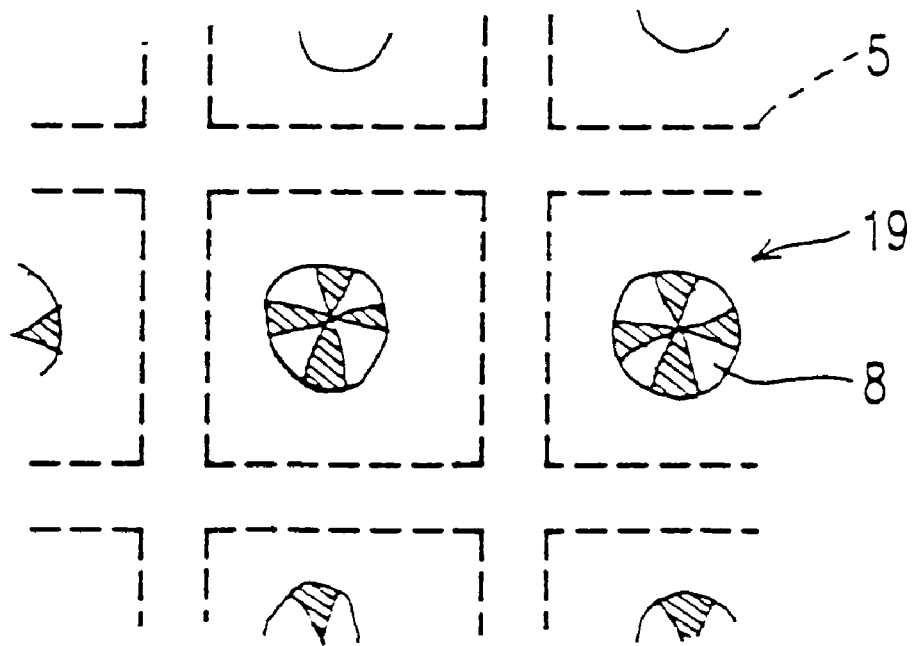
FIG. 15 is a schematic view showing the separation of the liquid crystal phase from the mixture.
Figure 16B:
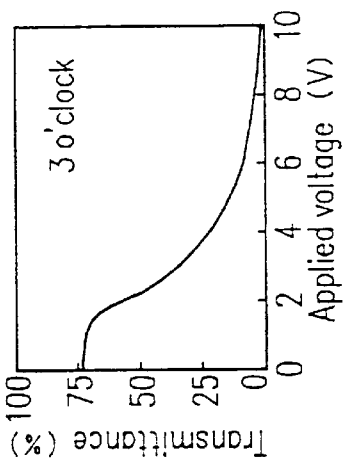
FIGS. 16A to 16F show the electro-optic characteristics of the liquid crystal display device of Example 1.
Figure 16C:
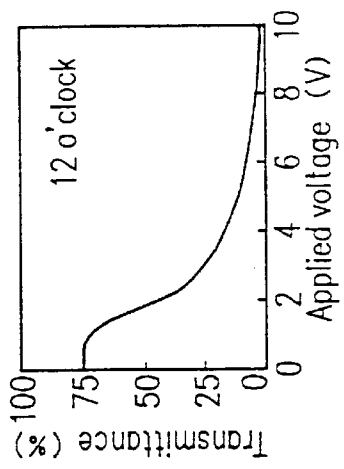
Figure 16A:
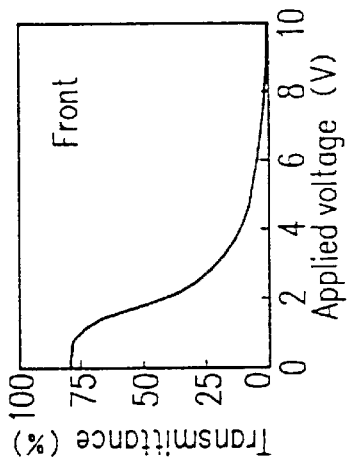
Figure 16E:
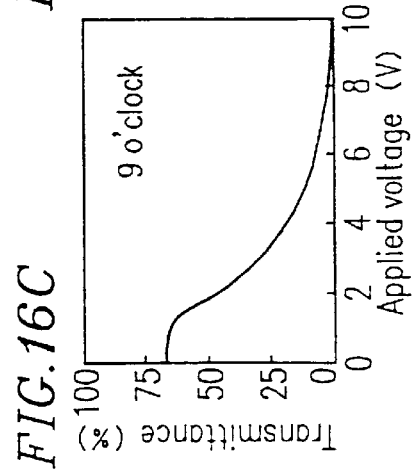
Figure 16D:
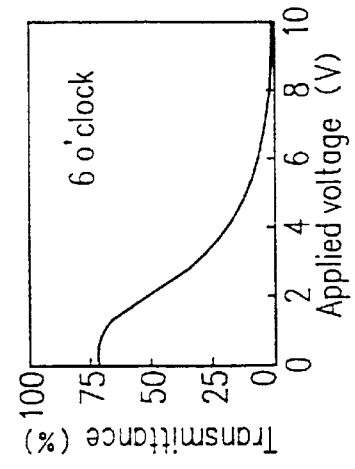
Figure 16F:
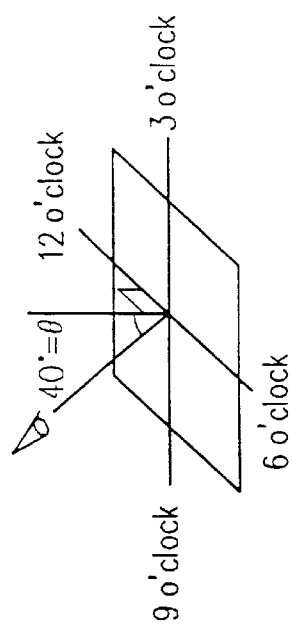
Figure 18:
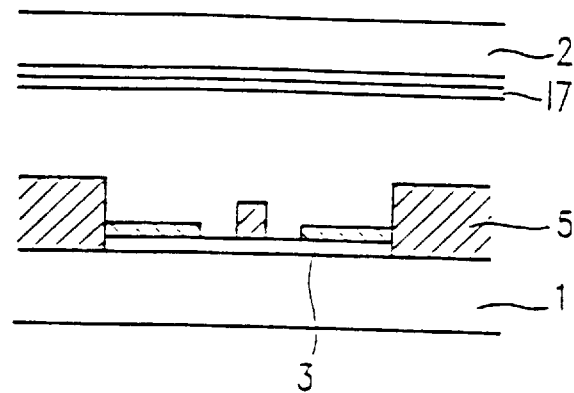
FIG. 18 is a sectional view of the liquid crystal cell of Example 3.

(2) Method for applying a voltage or a magnetic field at the time of phase separation It is important that the axial-symmetric orientation of liquid crystal molecules is formed within the pixel, and the symmetry axis of the orientation should not be displaced so widely with respect to the substrate. According to the examination by the inventors, when a voltage and/or a magnetic field are applied to the mixture containing at least the liquid crystal and the curable resin (or polymer) at the time of phase separation of the liquid crystal from the curable resin, it is possible to fix the axis for the axial-symmetric orientation of the liquid crystal molecules in the liquid crystal region in the vertical direction to the substrates for all the pixels. This phenomenon is preferable because, by using the island having the vertical alignment property such as the convex portion made of a material having the vertical alignment property for aligning the liquid crystal molecules, it is ensured that the axis for the axial-symmetric orientation can be controlled more stably. The application of a voltage and/or a magnetic field is especially effective when the liquid crystal is in a small droplet state appearing from a uniform phase 19 as shown in FIG. 15. Therefore, the voltage and/or the magnetic field may be weakened before the liquid crystal region 8 expands to cover the entire pixel. The magnitude of the voltage and the magnetic field should be greater than a threshold of the liquid crystal (a value evaluated by the TN cell) and may be periodically changed.

Next, the case where active elements such as thin film transistors (TFTs) are formed on the substrate will be described.

Figure 27:
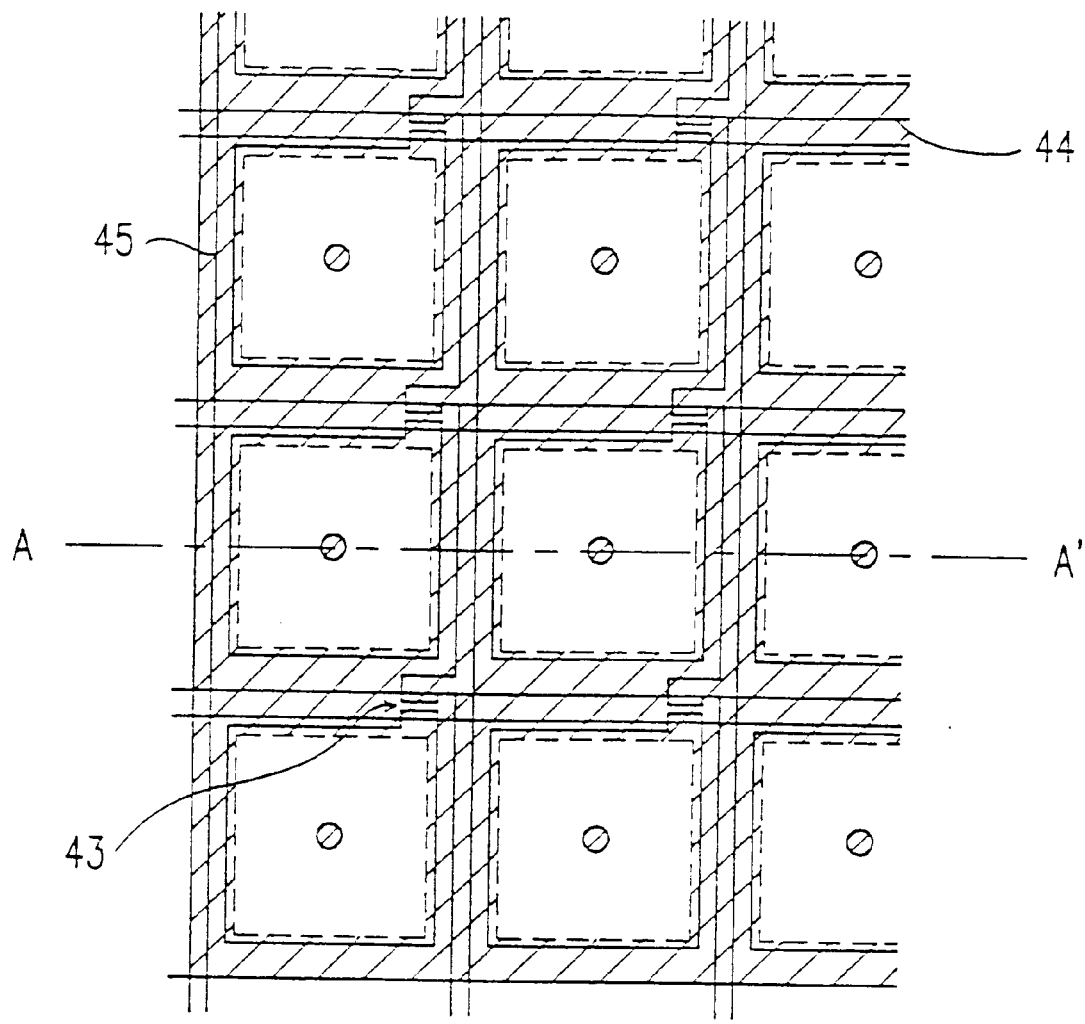
FIG. 27 is a plan view showing a resist pattern formed on a substrate having active elements according to the present invention.
Figure 28:
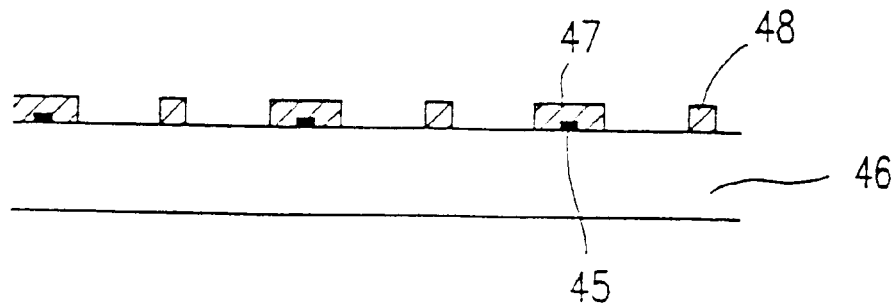
FIG. 28 is a sectional view taken along line A-A' of FIG. 27.

FIG. 27 is a plan view of a substrate having active elements according to the present invention. FIG. 28 is a sectional view taken along line A-A' of FIG. 27.

Referring to FIGS. 27 and 28, each pixel electrode is connected with a drain electrode of a TFT 43 as the active driving element. In order to apply a voltage to the pixel electrode, therefore, an appropriate voltage should be applied to a gate electrode connected with a gate line 44 so as to switch on the connection between a source line 45 and the pixel electrode, i.e., the connection between a source electrode and the drain electrode of the TFT 43. Accordingly, when the mixture of the liquid crystal and the curable resin is phase-separated while applying a voltage to the mixture, the axial-symmetric orientation of the liquid crystal molecules is disturbed due to a potential at the gate line 44 because a potential difference is generated between the pixel electrode (drain electrode) and the gate line 44 formed on the same substrate.

The inventors have found that the above trouble of disturbing the axial-symmetric orientation of the liquid crystal molecules can be overcome by appropriately controlling the timing and the time of the application of a voltage to the gate electrode, and the magnitude of the voltage as described below.

In order to minimize the potential difference between the pixel electrode and the gate line 44 formed on the same substrate, the voltage applied to the pixel electrode of the cell should be such that, at the curing of the curable resin, the signal voltage for driving the gate electrode of the active driving element is synchronous with the signal voltage for driving the source electrode of the active driving element and that the pulse width of the former is a half or less of the cycle of the latter.

(Curable resin)

A photocurable resin and the like may be used as the curable resin for the present invention. Examples of the photocurable resin include an acrylic acid and acrylates having a long-chain alkyl group with three or more carbon atoms or having a benzene ring: more specifically, include isobuthyl acrylate, stearyl acrylate, lauryl acrylate, isoamyl acrylate, n-buthylmethacrylate, n-laurylmethacrylate, tridecylmethacrylate, 2-ethylhexylacrylate, n-stearylmethacrylate, cyclohexylmethacrylate, benzylmethacrylate, 2-phenoxyethylmethacrylate, isobornylacrylate, and isobornylmethacrylate. Further, in order to increase the physical strength of the polymer, a multi-functional resin having two or more functional groups is preferable. Examples of such a resin include bisphenol A dimethacrylate, bisphenol A diacrylate, 1,4-butanedioldimethacrylate, 1,6-hexanedioldimethacrylate, trimethylolpropanetrimethacrylate, trimethylolpropanetriacrylate, tetramethylolmethanetetraacrylate, neopentyldiacrylate, and R-684. Further, in order to clearly phase-separate the liquid crystal from the curable resin, resins obtained by halogenating, especially chlorinating or fluorinating the above monomers, are more preferable. Examples of such resins include 2,2,3,4,4,4-hexafluorobuthylmethacrylate, 2,2,3,4,4,4-hexachlorobuthylmethacrylate, 2,2,3,3-tetrafluoropropylmethacrylate, 2,2,3,3-tetrafluoropropylmethacrylate, parfluorooctylethylmethacrylate, parchloroocrylethylmethacrylate, parfluoroocthylethylacrylate, and parchlorooctylethylacrylate.

(Photopolymerization retarder)

It is preferable to add a compound retarding the polymerization other than the curable resin to the mixture so as to enlarge the liquid crystal droplet, i.e., the liquid crystal region 8. Such a compound is, for example, a monomer or a compound which can stabilize a radical by a resonance effect after the production of the radical. For example, styrene, derivatives of styrene such as p-chlorostyrene, p-phenylstyrene, and p-methylstyrene, and a polymerization inhibitor such as nitrobenzene can be used.

(Photopolymerization initiator)

The mixture may also contain a photopolymerization initiator. Examples of such an initiator include Irgacure 184, 651, 907 (manufactured by Chiba Geigy), and Darocure 1173, 1116, 2956 (manufactured by E. Merck). A sensitizer which allows for the polymerization with visible light may also be added to the mixture to improve the retention.

The amount of the polymerization initiator added to the mixture is not specified in the present invention because it differs depending on the reactivity of each compound. It is preferable, however, in the range of 0.01% to 5% of the mixture of the liquid crystal and the curable resin (including the polymerizable liquid crystalline material to be described later). If the amount is less than 0.01%, the polymerization is not sufficient. If it is more than 5%, the phase separation of the liquid crystal from the polymer occurs so fast that the control of the phase separation is difficult. The resultant liquid crystal droplet is small, and this increases the driving voltage and decreases the control of the alignment of the liquid crystal on the substrate. Further, the liquid crystal region with the pixel becomes smaller, and, when the irradiation intensity distribution is produced by use of a photomask, the liquid crystal droplet is formed in the light shielding portion (outside the pixel). This lowers the contrast of the display.

(Liquid crystal material)

An organic mixture exhibiting a liquid crystalline state at and around a normal temperature is used as the liquid crystal of the present invention. This includes nematic liquid crystal (liquid crystal for 2-frequency driving; including liquid crystal of $\Delta \in <0$), cholesteric liquid crystal (in some cases exhibiting a selective reflection characteristic against visible light), smectic liquid crystal, ferroelectric liquid crystal, and discotic liquid crystal. These types of liquid crystal may be used in combination. The nematic liquid crystal with the cholesteric liquid crystal (a chiral agent) added thereto is preferable from the characteristic point of view.

Further, a liquid crystal material having excellent chemical reaction resistivity is preferable because the processing includes the photopolymerization. Examples of such a liquid crystal material include ZLI-4801-000, ZLI-4801-001, ZLI-4792, and ZLI-4427 (manufactured by Merck).

(Polymerizable liquid crystalline material)

A liquid crystalline compound having a polymerizable functional group (referred to as the polymerizable liquid crystalline material; this material itself does not need to exhibit the liquid crystallinity) may be added to the mixture of the liquid crystal and the curable resin. By this addition, polymers in the polymer wall can serve to align the orientation direction of the liquid crystal molecules effectively at the time of voltage application. Also, the disclination line arising at the periphery of the liquid crystal region can be suppressed.

Preferably, the selected liquid crystal and polymerizable liquid crystalline material resemble each other in the portions exhibiting the liquid crystallinity. In particular, when the liquid crystal is an F or Cl based material which shows a distinct chemical property, the polymerizable liquid crystalline material is preferably an F or Cl group material.

A compound expressed by formula (1) below is usable as the polymerizable liquid crystalline material.

A—B—LC  (1)

wherein A denotes a polymerizable functional group, for example, a functional group having an unsaturated bonding such as $CH_2=CH-$, $CH_2=CH-COO-$, $CH_2=CCH_3-COO-$, and

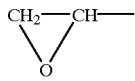

or a hetero ring structure with a distortion; B denotes a combining group combining the polymerizable functional group and the liquid crystalline compound, for example, bonding groups such as an alkyl chain ($-(CH_2)_n-$), an ester bonding ($-COO-$), an ether bonding ($-O-$), and a polyethyleneglycol chain ($-CH_2CH_2O-$), and a combination thereof; and LC denotes the liquid crystal compound. The combining group B preferably exhibits the liquid crystallinity when the polymerizable liquid crystalline material is mixed with the liquid crystal material. Accordingly, the combining group B has six or more bondings from the polymerizable functional group A to the rigid portion of the liquid crystalline material LC. The liquid crystalline material LC is a compound expressed by formula (2) below, a cholesterol ring, a derivative thereof, or the like.

D—E—G  (2)

G denotes a polar group which exhibits the dielectric constant anisotropy and the like of liquid crystal, for example, a benzene ring having a functional group such as $-CN$, $-OCH_3$, $-Cl$, $-OCF_3$, $-OCCl_3$, $-H$, and $-R$ (R denotes an alkyl group), a cyclohexane ring, a paradiphenyl ring, and phenylcyclohexane ring. E denotes a functional group combining D and G, for example, a single bonding, $-CH_2-$, $-CH_2CH_2-$, $-O-$, $-C\equiv C-$, and $-CH=CH-$. Finally, D denotes a functional group bonding with B, which influences the magnitude of the dielectric constant anisotropy and the refractive index anisotropy of the liquid crystal molecules, for example, a paraphenyl ring, a 1,10-diphenyl ring, 1,4-cyclohexane ring, and 1,10-phenylcyclohexane ring.

(Mixture ratio of the liquid crystal to the polymerizable material)

The mixture ratio by weight of the liquid crystal to the polymerizable material (including the curable resin and the polymerizable liquid crystalline material) is preferably 50:50 to 97:3, more preferably 70:30 to 90:10, though it depends on the size of the pixel. If the liquid crystal material is less than 50%, the effect of the polymer wall increases, which rises the driving voltage of the cell so greatly as to become impractical. If the liquid crystal material is more than 97%, the physical strength of the polymer wall lowers, and thus a stable performance is not obtainable. The percentage of the polymerizable liquid crystalline material in the total polymerizable material of the above ratio may be 0.5% or more by weight.

(Method for driving the cell)

The fabricated cell can be driven by a simple matrix driving method or an active matrix driving method by the use of TFTs or MIMs. The driving method is not specified in the present invention.

(Substrate material)

Any transparent solid body allowing visible light to be transmitted through may be used as the substrate material. Specifically, glass, quartz, plastic, or a polymer film may be used. Particularly, a plastic substrate is suitable because a roughened surface can be formed by embossing and the like. Also, two different types of materials may be used to form a cell having a pair of substrates made of different materials. The pair of substrates made of the same material or different materials may have different thicknesses.

Now, the present invention will be described by way of examples together with comparative examples as follows.

EXAMPLE 1

Referring to FIG. 11, the transparent electrodes 3 and 6 made of ITO (a mixture of indium oxide and tin oxide; 500 Å) were formed on the pair of glass substrates 1 and 2 having a thickness of 1.1 mm, respectively. The convex portion 4 and the first wall 5 were formed on the substrate 1 at the center of each pixel and surrounding the pixel, respectively, using a resist material (OMR 83; manufactured by Tokyo Ohka Kogyo Co., Ltd.). A light shielding layer made of an Mo thin film was formed under the resist. The substrate 1 and the multilayer structure formed thereon are hereinafter collectively referred to as a first substrate.

AL 4552 (manufactured by Japan Synthetic Rubber Co., Ltd.) was applied to the substrate 2 to form an alignment film 17 without rubbing. The substrate 2 and the multilayer structure formed thereon are hereinafter collectively referred to as a second substrate.

The first and second substrates are attached together with spacers of a size of 6 μm corresponding to a cell thickness interposed therebetween to form a cell.

A mixture of 0.1 g of R-684 (manufactured by Nippon Kayaku Co., Ltd.) as the photocurable resin, 0.1 g of p-phenylstyrene as the photopolymerization retarder, 0.06 g of a compound having formula (A) below, 3.74 g of ZLI-4792 (manufactured by Merck; containing 0.4% by weight of S-811) as the liquid crystal material, and 0.025 g of Irgacure 651 as the photopolymerization initiator were injected into the cell.

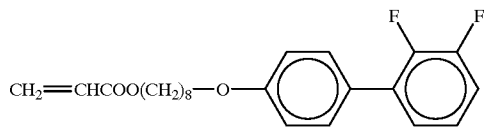

Thereafter, while the temperature was kept at 110° C. above the homogeneously miscible temperature of the mixture and a voltage of an effective voltage of 2.5 V, 60 Hz was applied between the transparent electrodes 3 and 6, the cell was irradiated with ultraviolet light for five minutes from the side of the first substrate 1 at the position of 10 mW/cm$^2$ below a high-pressure mercury lamp, so as to cure the resin. Then, the cell was gradually cooled to 40° C. for five hours, and after the temperature was returned to room temperature (25° C.), the cell was again irradiated with ultraviolet light so as to cure the resin completely.

The cell was observed at this stage by a polarizing microscope. As a result, as shown in FIG. 2, it was found that the liquid crystal region 8 surrounded by the polymer wall 7 was formed in the mono-domain state for each pixel and liquid crystal molecules were aligned axial-symmetrically around the portion 12 corresponding to the convex portion 4 made of the resist. Two polarizing plates having polarizing axes crossing each other at right angles were fixed to the cell and the cell was rotated. As a result, the cell was observed as if the extinction pattern 11 was immobilized while only the polymer wall 7 surrounding the pixel was rotating. This indicates that the liquid crystal molecules are aligned axial-symmetrically over the entire liquid crystal region 8.

Two polarizing plates having polarizing axes crossing each other at right angles were disposed on the opposite surfaces of the cell, so as to complete a liquid crystal display device.

The thus-fabricated liquid crystal display device was observed with the polarizing microscope while being applied with a voltage. As a result, it was confirmed that no disclination line was produced even at the time of voltage application and the entire pixel turned black.

The electro-optic characteristics and the evaluation of the roughness of display the thus-fabricated liquid crystal display device are shown in Table 1 below and FIG. 16. Table 1 also shows the results of Comparative Example 1 and Comparative Example 2 to be described later. The evaluation of the roughness of display obtained in Comparative Example 1 is shown in FIG. 17. As for the electro-optic characteristics, two polarizing plates having the polarizing axes parallel to each other were shown as blank (transmittance 100%). In the item "inversion at gray scale level" in Table 1, mark O indicates that no inversion occurred, mark indicates that inversion was easily observed, and mark indicates that inversion was weakly observed.

TABLE 1

|  | Example 1 | Comparative Example 1 | Comparative Example 2 |
| --- | --- | --- | --- |
| Light transmittance at no voltage application (%) | 77 | 87 | 78 |
| Inversion at gray scale level | ○ | x | Δ |
| Roughness of display | No | No | Yes* |

*when observed at a wide angle at gray scale level.

As shown in FIGS. 16A to 16F and 17A to 17F, the liquid crystal display device of Example 1 exhibits neither an inversion phenomenon as is observed for a TN cell of Comparative Example 1, nor an increase in the transmittance in the wide viewing direction at the time of voltage saturation. Moreover, as shown in Table 1, no roughness of display was observed at the gray scale level.

COMPARATIVE EXAMPLE 1

The pair of glass substrates 1 and 2 having the transparent electrodes 3 and 6 made of ITO formed thereon were used as in Example 1. Alignment films were formed on both substrates and rubbed. These substrates were attached together so that the alignment directions of the alignment films cross each other at right angles, with spacers of a size of 6 μm corresponding to the cell thickness interposed therebetween, so as to form a cell.

The liquid crystal material, ZLI-4792 (manufactured by Merck; containing 0.4% by weight of S-811) used in Example 1 was injected into the cell, and two polarizing plates were disposed on the outer surfaces of the cell so that polarizing axes thereof cross each other at right angles, so as to complete a liquid crystal display device.

The electro-optic characteristics and the evaluation of the roughness of display of the resultant liquid crystal display device are shown in Table 1 and FIGS. 17A to 17F.

EXAMPLE 2

In Example 2, a cell was fabricated in the same manner as in Example 1, except that in Example 2 the concave portion 15 was formed at the center of each pixel as shown in FIG. 12, and the same mixture as that used in Example 1 was injected into a space between the pair of substrates.

The resultant cell was heated to a temperature higher than the homogeneously miscible temperature of the mixture while a voltage of an effective value of 2.5 V, 60 Hz was applied between the transparent electrodes 3 and 6 of the cell. Then, the cell was gradually cooled so as to separate the liquid crystal. After the separation of the liquid crystal, the application of the voltage was discontinued. After the liquid crystal phase almost expanded to the entire pixel, the cell was irradiated with ultraviolet light, so as to cure the resin.

In the resultant liquid crystal display device, it was observed that the liquid crystal molecules were aligned axial-symmetrically around the concave portion 15 in the liquid crystal region. No roughness of display was observed at the gray scale level.

EXAMPLE 3

In Example 3, a liquid crystal display device was fabricated in the same manner as in Example 1, except that in Example 3 the convex portion 4 was formed at the center of each pixel and the concave portion 15 was formed around the convex portion 4.

In the resultant liquid crystal display device, it was observed that the liquid crystal molecules were aligned axial-symmetrically around the convex portion 4 in the liquid crystal region. No roughness of display was observed at the gray scale level.

EXAMPLE 4

In Example 4, a cell was fabricated in the same manner as in Example 1, except that in Example 4 an alignment film 16 was formed on the substrate 1 covering the convex portion 4 and the first wall 5 by spin coating as shown in FIG. 5. The same mixture as that used in Example 1 was injected in a space between the pair of substrates. The resin was cured in the same manner as that described in Example 2.

The phase separation of the mixture of this example at the gradual temperature drop was examined, and it was confirmed that: The liquid crystal phase appeared in the region having a larger cell thickness (the concave portion 15) and expanded therefrom; the symmetry axis of the orientation of the liquid crystal molecules was located in the region having the larger cell thickness; and a liquid crystal droplet was grown while the position of the axis for the axial-symmetric orientation of the liquid crystal molecules was intentionally controlled to correspond to the convex portion 4 at the center of the pixel. Such a droplet formed in the region having a larger cell thickness is shaped more spherical compared with a droplet formed in a region having a smaller cell thickness. The spherical droplet is considered to have a comparatively small surface energy and thus is stable. Accordingly, the liquid crystal phase appears from the region having the largest cell thickness and the position of the symmetry axis of the orientation of the liquid crystal molecules is limited.

In the resultant liquid crystal display device, it was observed that the liquid crystal molecules were aligned axial-symmetrically around the convex portion 4 in the liquid crystal region. No roughness of display was observed at the gray scale level.

EXAMPLE 5

Figure 19:
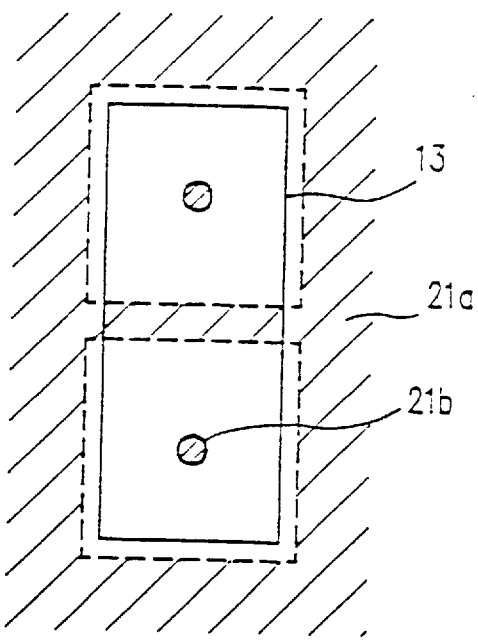
FIG. 19 is a plan view of the liquid crystal cell of Example 5.

In Example 5, a cell was fabricated in the same manner as in Example 1, except that in Example 5, as shown in FIG. 19, a rectangular pixel 13 was divided into two and a first wall 21a and convex portions 21b were formed on the substrate 1 using a black resist (CFPR-BK501S; manufactured by Tokyo Ohka Kogyo Co., Ltd.).

The thus-fabricated cell was observed with the polarizing microscope and it was found that two liquid crystal domains each in the mono-domain state were formed in each pixel and that the liquid crystal molecules in each domain were aligned axial-symmetrically around a portion corresponding to the convex portion 21b as the symmetry axis.

In the resultant liquid crystal display device, it was observed that the liquid crystal molecules were aligned axial-symmetrically around the convex portion 21a in the liquid crystal region. No roughness of display was observed at the gray scale level.

COMPARATIVE EXAMPLE 2

Figure 20:
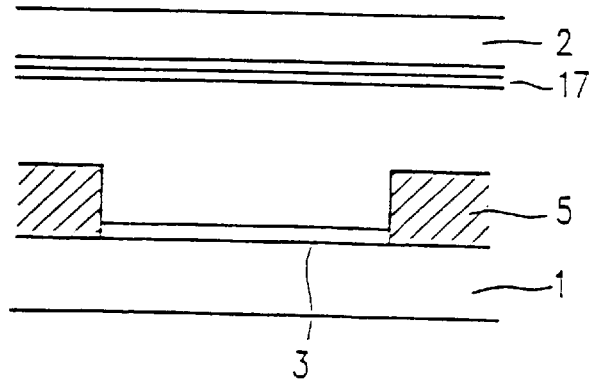
FIG. 20 is a sectional view of the liquid crystal cell of Comparative Example 2.

In Comparative Example 2, a cell was fabricated in the same manner as in Example 1, except that in this example the center portion of the pixel is flat as shown in FIG. 20. The same mixture as that used in Example 1 was injected in a space between the pair of substrates and cured as described in Example 1.

Figure 21A:
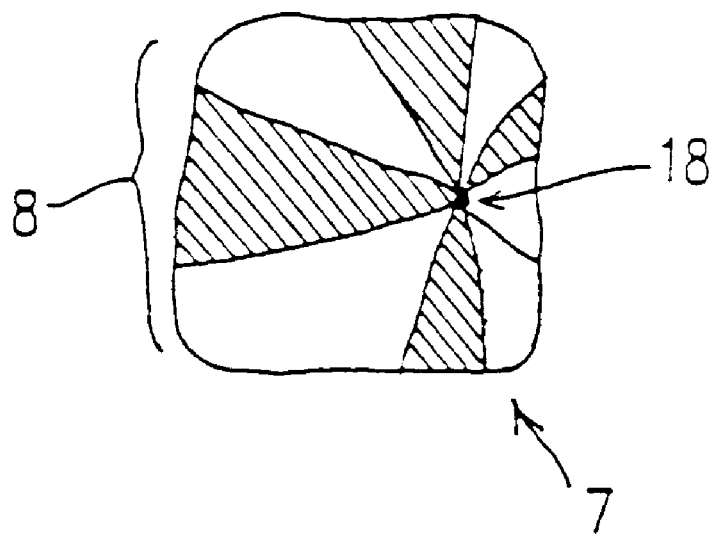
FIGS. 21A and 21B are diagrams of the liquid crystal cell of Comparative Example 2 observed with a polarizing microscope.
Figure 21B:
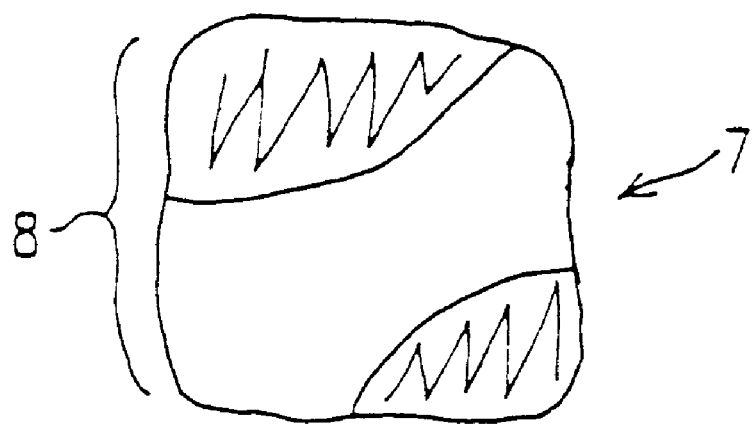

The thus-fabricated cell was observed with the polarizing microscope and it was found that most liquid crystal regions had the axial-symmetric orientation. However, in some liquid crystal regions 8, the position of a symmetry axis 18 was displaced as shown in FIG. 21A, while, in other liquid crystal regions 8, no symmetry axis was formed as shown in FIG. 21B. Significant roughness of the display was not observed especially at the gray scale level at the time of voltage application.

EXAMPLE 6

In Example 6, a cell was fabricated in the same manner as in Example 1, except that in Example 6 an alignment film 16a having axial-symmetric orientation axes was formed on a substrate 1a as shown in FIG. 14A. The alignment film 16a was formed in the following manner.

Referring to FIGS. 14B to 14D, after the formation of the first wall 5 on the substrate 1a, a mixed material 22 containing two different types of polymer materials (such as polyimide) was applied to the substrate 1a covering the first wall 5, dried to be phase-separated, and then baked.

The two types of polymer materials were phase-separated axial-symmetrically in each pixel on the substrate 1a, and thus the alignment film 16a having the axial-symmetric orientation axes was obtained. A mixture containing the liquid crystal and the curable resin as described in Example 1 was injected into a space formed between the pair of substrates, and under the processing conditions as described in Example 1, a liquid crystal display device where liquid crystal molecules were aligned axial-symmetrically was fabricated.

The thus-fabricated liquid crystal display device was observed with the polarizing microscope and found that the liquid crystal molecules were aligned axial-symmetrically with the orientational pattern substantially identical to the orientation axes of the alignment film 16a. The roughness of display was hardly observed at the gray scale level.

EXAMPLE 7

In Example 7, the case where the convex portion formed at the center of the pixel is made of a material having the vertical alignment property so as to form stably orientation axes in axial-symmetric manner will be described.

Figure 29:
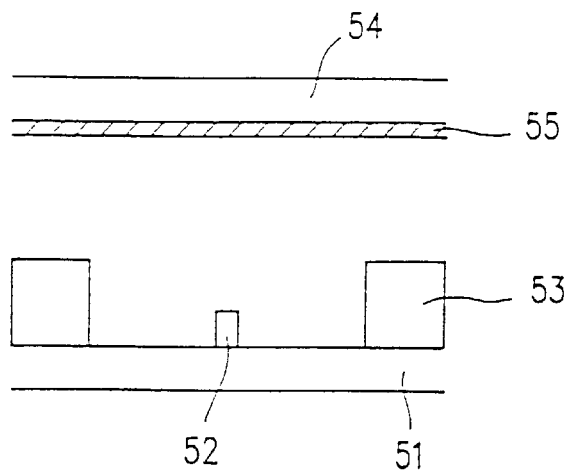
FIG. 29 is a sectional view of the liquid crystal cell of Example 7.

As shown in FIG. 29, a convex portion 52 was formed at the center of the pixel on a substrate 51 which includes a transparent electrode made of ITO (a mixture of indium oxide and tin oxide; thickness: 500 Å) formed on a glass substrate (thickness: 1.1 mm). The convex portion 52 was made of a resist having the vertical alignment property (a resist produced by adding a curable material to JALS 204). A first wall 53 was formed using a resist material (OMR 83; manufactured by Tokyo Ohka Kogyo Co., Ltd. ) outside the pixel portion so as to enclose the convex portion 52. A light shielding layer made of an Mo thin film was formed under the resist. The substrate 51 and the structure formed thereon are hereinafter called a first substrate.

AL 4552 (manufactured by Japan Synthetic Rubber Co., Ltd. ) was applied to another substrate 54 to form an alignment film 55 without rubbing. The substrate 2 and the film formed thereon are hereinafter collectively called a second substrate.

The first and second substrates are attached together with spacers of a size of 5 $\mu$m corresponding to a cell thickness interposed therebetween so as to form a cell. A mixture of 0.1 g of R-684 (manufactured by Nippon Kayaku Co., Ltd.), 0.1 g of p-phenylstyrene, 0.06 g of a compound having formula (A) above, 3.74 g of ZLI-4792 (manufactured by Merck; containing 0.4% by weight of S-811) as the liquid crystal material, and 0.02 g of Irgacure 651 as the photopolymerization initiator was injected into the cell.

Thereafter, the temperature of the cell was kept at 110° C. Then, the cell was cooled to a room temperature, and heated again to between 50° C. and 60° C. while being applied with a voltage of an effective value of 5 V, 60 Hz. At this temperature, the voltage was turned on and off repeatedly so as to align the liquid crystal axial-symmetrically. The cell was then gradually cooled to 30° C. for seven hours.

At the above state, the liquid crystal molecules in each pixel were aligned axial-symmetrically. This indicates that the convex portion of Example 7 made of the material having the vertical alignment property was effective in improving the stability of the axial-symmetric orientation of the liquid crystal molecules. At this state, the cell was irradiated with ultraviolet light for 20 minutes from the side of the first substrate at the position of 2 mW/cm$^2$ below a high-pressure mercury lamp, so as to cure the resin.

Then, the cell may be cooled to a temperature less than the room temperature to facilitate the separation of the liquid crystal from an unreacted portion of the photocurable resin and may be irradiated again with ultraviolet light.

Figure 30:
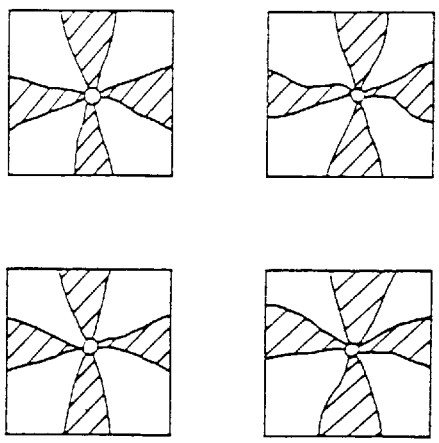
FIG. 30 is a diagram of the liquid crystal cell of Example 7 observed with the polarizing microscope.

The thus-fabricated liquid crystal cell was observed with the polarizing microscope. As a result, as shown in FIG. 30, it was found that the liquid crystal molecules were aligned axial-symmetrically around the island of the resist (the convex portion made of the material having the vertical alignment property) in the mono-domain state for each pixel. This axial-symmetric orientation was observed in almost all liquid crystal regions.

Two polarizing plates having polarizing axes crossing each other at right angles were disposed on the opposite outer surfaces of the cell, so as to complete a liquid crystal display device surrounded by the polymer wall. The above liquid crystal cell was observed with the polarizing microscope with a voltage applied thereto. As a result, it was found that no disclination line arose even at the time of voltage application and the entire pixel turned black.

The electro-optic characteristics and the evaluation of the roughness of the fabricated liquid crystal cell are shown in Table 2 below. It was found from Table 2 that the liquid crystal cell of Example 7 exhibited neither an inversion phenomenon as was observed in the TN cell nor an increase in the transmittance in a wide viewing direction at the voltage saturation. In the measurement, the two polarizing plates having the polarizing axes parallel to each other were shown as blank (transmittance 100%). No roughness of display was observed at the gray scale level. In the item "inversion at gray scale level" in Table 2, a mark O indicates that no inversion occurred.

TABLE 2

|  | Example 7 | Example 8 | Example 9 |
|---|---|---|---|
| Light transmittance at no voltage application (%) | 78 | 79 | 77 |
| Inversion at gray scale level | ○ | ○ | ○ |
| Roughness of display | No | No | No |

EXAMPLE 8

Example 8, which shows the case where a high-temperature irradiation and gradual cooling method is adopted for the fabrication of the liquid crystal cell of Example 7, will be described.

A mixture containing the liquid crystal material and the photocurable resin material was injected into a space between the pair of substrates as described in Example 7. The cell was heated to 110° C. which is the homogeneously miscible temperature of the liquid crystal. Thereafter, while keeping the temperature of 110° C., a voltage having an effective value of 2.5 V, 60 Hz was applied between the transparent electrodes. Simultaneously, the cell was irradiated with ultraviolet light for four minutes from the side of the first substrate at the position of 10 mW/cm$^2$ below a high-pressure mercury lamp, so as to cure the resin. At the temperature of 50° C. to 60° C. the voltage was turned on (a voltage at which liquid crystal is driven or higher) and off repeatedly. The cell was then gradually cooled to 30° C. for two hours. Thereafter, the temperature was returned to room temperature (25° C.) and the cell was again irradiated with ultraviolet light by use of the same ultraviolet irradiation apparatus, so as to complete the curing of the curable resin.

The electro-optic characteristics and the evaluation of roughness of the thus-fabricated liquid crystal cell are shown in Table 2 above.

EXAMPLE 9

In Example 9, the case where two convex islands having the vertical alignment property are formed at the center of the pixel on the two substrates will be described.

Figure 31:
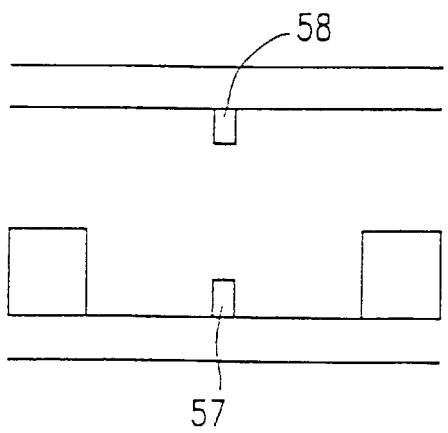
FIG. 31 is a sectional view of the liquid crystal cell of Example 9.

Referring to FIG. 31, a convex portion 57 having the vertical alignment property was formed on one of the substrates as the first substrate of Example 7. A convex portion 58 was formed on an alignment film of the other substrate at a position corresponding to the convex portion 57. Thus, a liquid crystal cell was fabricated as in Example 7. In the resultant liquid crystal cell, i.e., the liquid crystal display device, the liquid crystal molecules were stably aligned axial-symmetrically, and no roughness of display was observed at the gray scale level.

The electro-optic characteristics and the evaluation of roughness of the thus-fabricated liquid crystal cell are shown in Table 2 above.

In Examples 7 to 9, the liquid crystal molecules are aligned in each pixel axial-symmetrically around the center portion of the pixel as the center of the symmetry. Since the liquid crystal molecules are aligned in all directions, the trouble of the lowering of the contrast depending on the viewing direction arising in the conventional liquid crystal display devices can be improved. Further, since an island having the vertical alignment property is formed at the center of each pixel, the axial symmetric orientation of the liquid crystal molecules is stabilized and the position of the axis of the axial-symmetric orientation in the pixel can be definitely determined. This makes it possible to reduce the roughness of display which is observed when the viewing angle is changed. Thus, a liquid crystal device with a wide viewing angle providing uniform and high-contrast images can be realized.

In Examples 7 to 9, the convex portion having the vertical alignment property was formed at the center of each pixel. A concave portion may be formed in place of the convex portion, or both the convex and concave portions may be formed in combination.

EXAMPLE 10

In Example 10, active driving elements are formed on the substrate on which the convex or concave portion for obtaining the stable axial-symmetric orientation axes is formed for each pixel. A color filter substrate as used as the counter substrate. At the phase separation, a source signal, a gate signal, and a timing voltage for a counter voltage are applied.

As shown in FIGS. 27 and 28, Cr was deposited on a glass substrate 46 by vapor deposition and patterned to form gate lines 44. Then, amorphous silicon for a gate insulating film was deposited by a plasma CVD apparatus and polycrystallized by laser annealing. The polycrystalline silicon was patterned into islands to form semiconductor layers. P-doped amorphous silicon was then deposited on the semiconductor layers by plasma CVD and patterned so as to cover the semiconductor layers. ITO was then deposited and patterned to form pixel electrodes. Thereafter, Cr and Al were deposited and patterned into a predetermined shape. These Al, Cr, and P-doped amorphous silicon were etched in this order to form source and drain electrodes. Silicon nitride was deposited by plasma CVD to form a protection film. Finally, the protection film was etched at the periphery of the substrate to form terminal electrodes, so as to complete the TFT substrate. A resist material (OMR 83) was applied to the TFT substrate by spin coating. A light shielding mask covering the pixel electrode area and exposing the area of a diameter of 10 $\mu$m from the center of each pixel was superposed on the resist-coated substrate, and the substrate was irradiated with ultraviolet light from the side of the light shielding mask so as to etch uncured portions. Thus, walls 47 were formed in areas other than the pixel electrodes and convex portions 48 having a diameter of 10 m were formed in a pattern of islands made of the resist at the centers of the pixel electrodes.

As described above, the convex (or concave) portions of the pattern of islands are formed on the side of the first substrate facing the liquid crystal regions. Thus, the liquid crystal molecules can be aligned axial-symmetrically in each liquid crystal region using the convex portion or the vicinity thereof as the vertical axis.

As for the second substrate, as shown in FIGS. 24 and 25, light shielding films 32 were formed at gaps between the regions on the counter substrate corresponding to the pixels formed on the first substrate. Then, resin layers were formed on the above regions so as to form color filter portions 33 which were colored with R, G, and B in order. The resultant second substrate was applied with a resist material (OMR 83) by spin coating. A light shielding mask exposing the areas other than the color filter portions 33 was then superposed on the coated substrate. The substrate was then irradiated with ultraviolet light from the side of the light shielding mask, and uncured portions were etched. Thus, the areas other than the color filter portions 33 were filled with resist resin 34 to smooth the surface. In other words, the color filter portions 33 were formed on a substrate 31 and the remaining areas other than the color filter portions 33 were filled with the resist resin 34 so as to smooth the surface.

As described above, in the liquid crystal display device where the liquid crystal molecules are aligned axial-symmetrically in each pixel, the surface of at least one substrate (the second substrate in Example 10) is smoothed.

Figure 32:
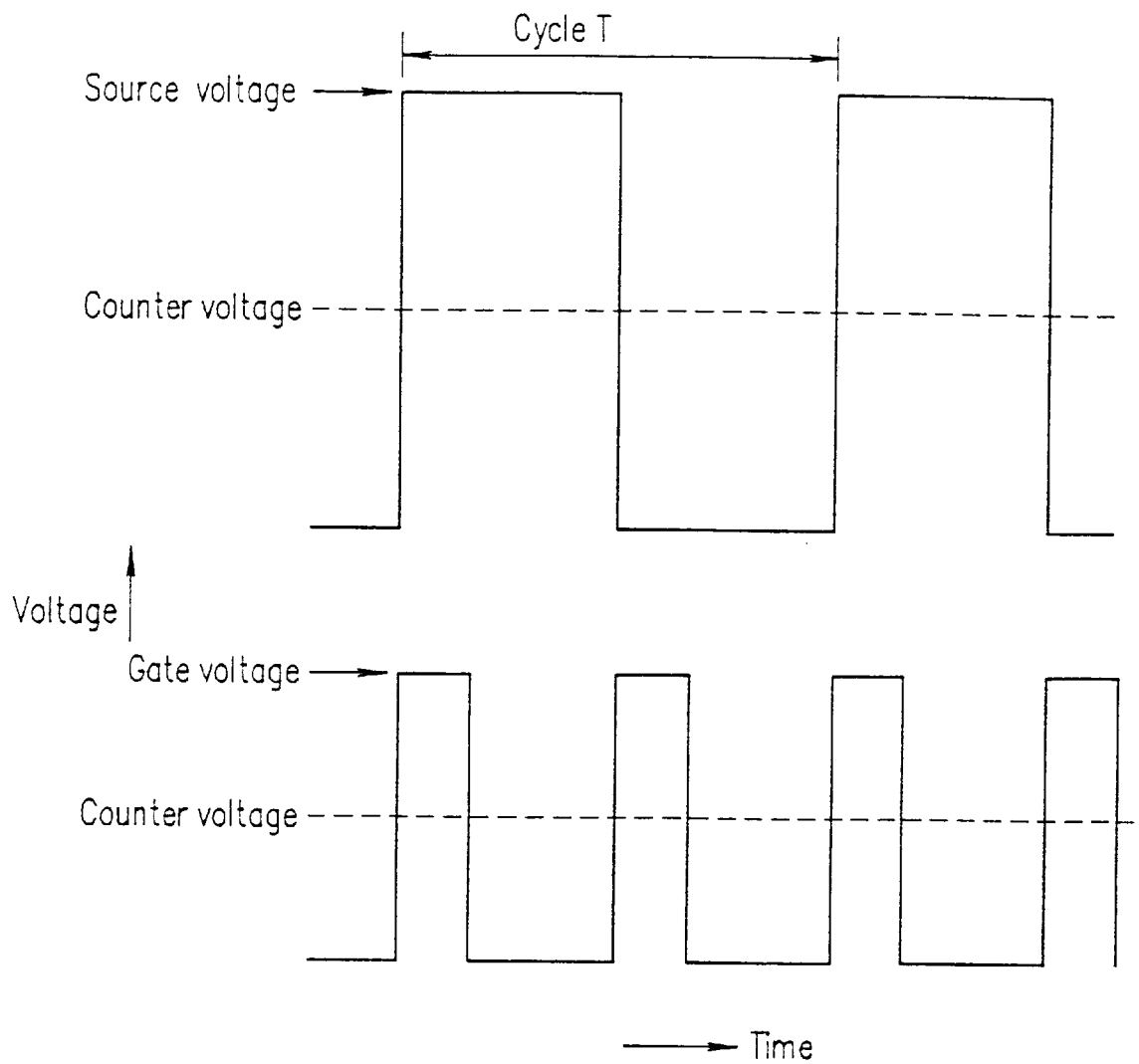
FIG. 32 is a timing diagram of a source signal, a gate signal, and a counter voltage to be applied to pixel electrodes of the liquid crystal display device of Example 10.

The thus-fabricated first and second substrates were attached together with spacers of a size of 6 $\mu$m interposed therebetween as the cell thickness, so as to form a cell. Predetermined positions on the first and second substrates are not covered with the resist so as to form ITO electrodes for electrical connection. They are electrically connected with a carbon paste (TU-100-5S, manufactured by Asahi Kagaku). The mixture containing the liquid crystal material and the curable resin material described in Example 1 was injected into the cell. The cell was heated to 110° C., and while this temperature was kept, signal voltages shown in FIG. 32 were applied to the source electrode, the gate electrode, and the counter electrode using the potential at the counter electrode as the reference: a rectangular wave voltage of 60 Hz, ±2.5 V, and a ½ duty was applied to the source electrode; and a rectangular wave voltage of 120 Hz, +10 V for 60 $\mu$s and −16 V for the other of the cycle was applied to the gate electrode in synchronization with the source voltage. Simultaneously, the cell was irradiated with ultraviolet light of an intensity of 10 mW/cm$^2$ from a high-pressure mercury lamp from the side of the first substrate, so as to cure the curable resin. Thereafter, the cell was gradually cooled to 40° C. for five hours. After the temperature was returned to room temperature (25° C.), the cell was again irradiated with ultraviolet light by use of the same irradiation apparatus, so as to complete the curing of the curable resin.

The thus-fabricated cell was observed with the polarizing microscope. As a result, as shown in FIG. 2, it was found that the liquid crystal molecules were aligned axial-symmetrically around the island of the resist in the mono-domain state for each pixel. This axial-symmetric alignment was realized in almost all liquid crystal regions. This was judged from the fact that the Schlierene pattern in the liquid crystal region was observed immobilized while only the polymer wall 7 surrounding the pixel was rotating.

Two polarizing plates having polarizing axes crossing each other at right angles were disposed on the opposite outer surfaces of the cell, so as to complete a liquid crystal display cell surrounded by the polymer wall. The above cell was observed with the polarizing microscope with a voltage applied thereto. As a result, it was found that no disclination line arose even at the time of voltage application and the entire pixel turned black. The liquid crystal cell exhibited neither an inversion phenomenon, as was observed in the TN cell (Comparative Example 1), nor an increase in the transmittance in the wide viewing angle at the time of voltage saturation. In the measurement, the two polarizing plates having the polarizing axes parallel to each other were shown as blank (transmittance 100%). No roughness of display was observed at the gray scale level.

Conventionally, concaves are present between adjacent color filter portions. At the phase separation of the liquid crystal from the curable resin, the liquid crystal tends to appear in portions having a larger cell thickness. Accordingly, since liquid crystal droplets tend to be formed at the concaves between the color filter portions, the axial-symmetric orientation of the liquid crystal molecules is disturbed by the concaves. This trouble can be overcome by filling the concaves with the resist material to smooth the surface of the color filter substrate. By this smoothing treatment, the liquid crystal can be separated only at the convex portion on the opposing substrate. In the case of active driving elements, many steps are formed by the multilayer structure of the active driving elements and the wirings thereof. Therefore, the axial-symmetric orientation of the liquid crystal molecules in the droplet is disturbed. This trouble can be overcome by filling concaves formed by these steps to smooth the surface.

Also, the signal voltage for driving the gate of the active driving element is synchronous with the signal voltage for driving the source thereof, the pulse width of the former is a half or less of the cycle of the latter, and the resin is cured while the voltage is applied. Accordingly, the potential difference between the pixel electrode and the gate line formed on the same substrate is decreased, and such a trouble that the axial-symmetric orientation of the liquid crystal molecules is disturbed due to the potential at the gate line can be overcome.

As described above, in the liquid crystal display device of this example, the position of the axis of the axial-symmetric orientation of the liquid crystal molecules can be definitely determined, the roughness of display observed when the viewing angle is changed can be minimized, and a liquid crystal device with a wide viewing angle providing uniform and high-contrast images can be realized.

Thus, according to the present invention, liquid crystal molecules in each liquid crystal region are aligned axial-symmetrically. Accordingly, the variation in the contrast observed in conventional liquid crystal display devices can be minimized. Since the position of the symmetry axis in each pixel can be controlled and the symmetry axis can be vertical to the substrates, the roughness of display observed when the viewing angle is changed can be reduced. Thus, a liquid crystal display device with a wide viewing angle providing uniform and high-contrast images can be realized. Moreover, the disclination line is formed outside the pixel or made less visible. This makes it possible to improve the display quality.

Further, the convex or concave portion, as an island having the vertical alignment property, is formed at the center of each pixel. Accordingly, the axial symmetry is stabilized, and the position of the axis for the axial-symmetric orientation in each pixel can be definitely determined. This serves to reduce the roughness of display observed when the viewing angle is changed. Also, a liquid crystal display device with a wide viewing angle providing uniform and high-contrast images can be realized.

Moreover, by smoothing the surface of the electrode substrate facing the other substrate, the orientation of the liquid crystal droplet is prevented from being disturbed by concaves on the substrate. For example, when a color filter is formed on the electrode substrate, concaves between color filter portions are filled with a resin to smooth the surface. Thus, the liquid crystal phase appears only at the concave or convex portions formed on the other substrate facing the color filter. As another example, when active driving elements are formed on the electrode substrate, many steps are formed on the surface by the multilayer structure of the active driving elements and the wirings thereof. In this case, also, the steps are filled with a resin to smooth the surface. Thus, the liquid crystal phase appears only at the concave or convex portion formed at the center of each pixel. Accordingly, the position of the axis for the axial-symmetric orientation in each pixel can be definitely determined, the roughness of display observed when the viewing angle is changed can be minimized, and a liquid crystal device with a wide viewing angle providing uniform and high-contrast images can be realized.

Furthermore, the signal voltage for driving the gate of the active driving element is synchronous with the signal voltage for driving the source thereof. The cycle of the former is a half of the cycle of the latter, and the pulse width of the former is a half or less of the cycle of the latter. The resin is cured while the above voltages are applied. Since the gate signal line is arranged in the vicinity of each pixel electrode, the potential at the gate signal voltage affects the potential in the vicinity of the pixel electrode. The potential in the vicinity of the pixel electrode is less affected by the gate signal voltage if the duration of the signal voltage applied to the gate electrode is shorter than the duration when the source driving signal voltage is applied to the pixel electrode. Accordingly, the potential difference between the pixel electrode and the gate line formed on the same substrate is decreased, and the trouble with the axial-symmetric orientation possibly being disturbed due to the potential at the gate line can be overcome. Accordingly, the position of the axis for the axial-symmetric orientation of the liquid crystal in each pixel can be definitely determined, the roughness of display observed when the viewing angle is changed can be minimized, and a liquid crystal device with a wide viewing angle providing uniform and high-contrast images can be realized.

EXAMPLE 11, COMPARATIVE EXAMPLES 3 and 4

In Example 11, a method for simply forming a concave portion on a color filter portion for controlling the position of the symmetry axis for the alignment of liquid crystal molecules will be described.

Referring to FIGS. 33A to 33E, the method for fabricating a color filter substrate 60 of this example will be described.

Figure 33A:
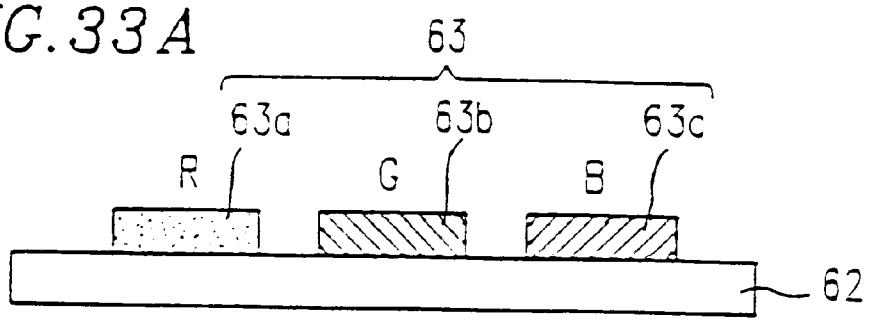
FIGS. 33A to 33E are sectional views showing the steps for fabricating a color filter substrate according to the present invention.

First, a color filter 63 is formed on a substrate 62 as shown in FIG. 33A. The color filter 63 is composed of color filter portions 63a, 63b, and 63c corresponding to red (R), green (G), and blue (B), respectively. The color filter portions 63a, 63b, and 63c are formed so as to correspond to the respective pixels. Such a color filter 63 may be formed by electrodeposition, film adhesion, printing, color-resist formation, or the like, though not specified in the present invention.

Figure 33B:
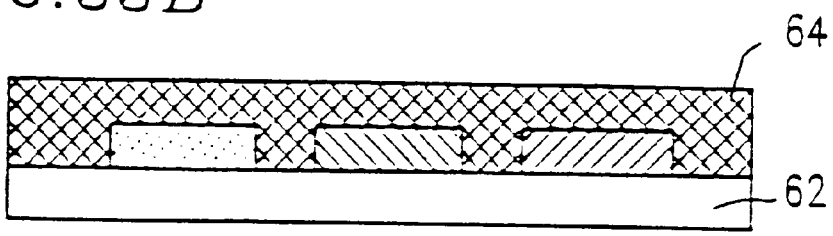
Figure 33C:
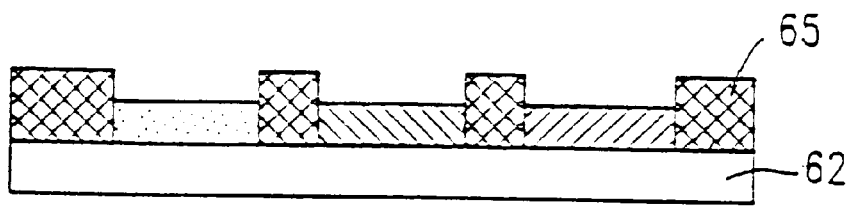

Then, as shown in FIG. 33B, a resist 64 is applied to the substrate 62, covering the color filter portions 63a, 63b, and 63c. As shown in FIG. 33C, The resist 64 is exposed to light and developed so that convex walls 65 made of the resist can be formed in the portions outside the pixel portions (portions other than the color filter portions). It is important that the convex walls 65 formed on the substrate 62 should be higher than the color filter portions 63a, 63b, and 63c so as to extrude farther toward the liquid crystal layer.

Figure 33D:
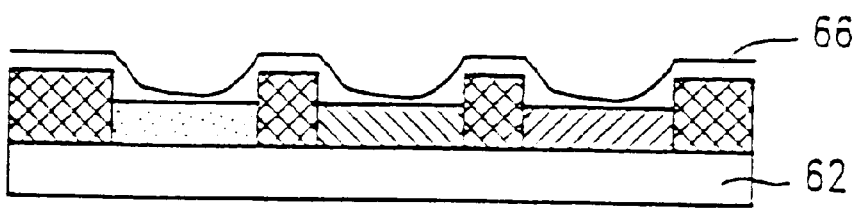
Figure 33E:
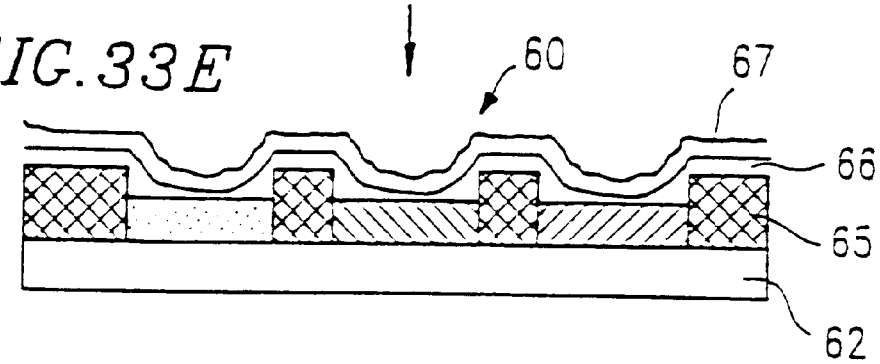

Thereafter, as shown in FIG. 33D, a thin overcoat layer 66 is formed over the substrate 62 having the convex walls 65. Due to the surface tension (meniscus) of the liquid overcoat material and the extrusion of the convex walls 65, concave (conical) portions are formed on the respective color filter portions 63a, 63b, and 63c. A transparent electrode 67 is formed over the overcoat layer 66 formed on the substrate 62, as shown in FIG. 33E. An insulating layer and/or an alignment film may be formed on the transparent electrode 67, if required. Thus, the color filter substrate 60 is fabricated.

(Overcoat material)

A general overcoat material may be used as the material for forming the concave portions. In the present invention, the overcoat layer is covered with the transparent electrode and eternally remains in the liquid crystal cell. Accordingly, it is preferable to use polyimide, epoxyacrylate, and the like which have excellent heat resistance properties.

(The number of domains in one pixel)

The number of domains in each pixel is preferably as small as possible. If a number of domains exist in one pixel, a disclination line arises at each boundary of domains, causing degradation in the black level of the display. It is preferable, therefore, that the pixel portion is covered by a single domain where liquid crystal molecules are aligned axial-symmetrically. With this arrangement, since the disclination line is formed outside the domain at the time of voltage application, the disclination line seldom intrudes inside the pixel portion.

In the case of fabricating a color liquid crystal display device having the rectangular pixel 13 as shown in FIG. 3 according to the method of Example 11, the liquid crystal region 8 may have two or more liquid crystal domains 14a and 14b each having liquid crystal molecules aligned axial-symmetrically. In this case, two color filter portions are formed in correspondence with the two liquid crystal domains 14a and 14b in the pixel 13. Then, in accordance with the steps shown in FIGS. 33A to 33E, the concave portions for controlling the position of the symmetry axis for the alignment of the liquid crystal can be formed for the two liquid crystal domains 14a and 14b in the pixel 13. The convex walls 65 may be made of a material having a light shielding property so as to serve as a black mask (BM).

(Substrate material)

The substrate 62 may be made of any transparent solid body allowing visible light to transmit therethrough. Specifically, glass, quartz, plastic, and the like may be used.

Now, the method for fabricating the color filter substrate 60 of Example 11 will de described in detail with reference to FIGS. 33A to 33E.

The color filter portions 63a, 63b, and 63c corresponding to R, G, and B are formed for respective pixels on the glass substrate 62 (thickness: 1.1 mm) by use of a color resist. The resist 64 (V259PA, manufactured by Nippon Steel Chemical Co., Ltd.) is then applied to the substrate 62, covering the color filter portions 63a, 63b, and 63c. The resist 64 is exposed to light and developed so that the convex portions 65 made of the resist are formed outside the pixels. The convex portions 65 are formed so as to extrude from the pixel portions by about 1 μm. The thin overcoat layer 66 (V259, manufactured by Nippon Steel Chemical Co., Ltd.) is formed over the substrate 62 having the convex walls 65 so as to form conical concave portions on the pixel portions. The transparent electrode 67 made of ITO (a mixture of indium oxide and tin oxide) having a thickness of 50 nm and an insulating film ($SiO_2$) are formed over the substrate 62 in this order.

Figure 34:
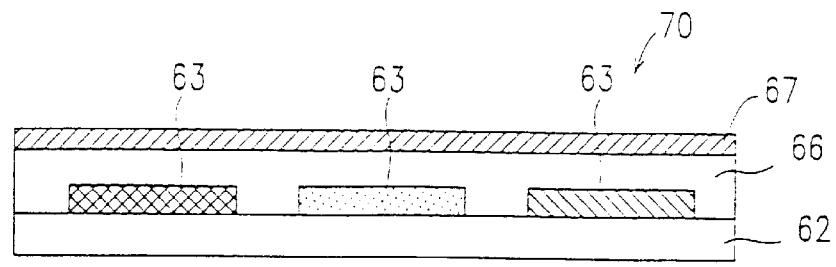
FIG. 34 is a sectional view of a color filter substrate of Comparative Example 3 where the surface is smoothed.

As Comparative Example 3, a color filter substrate 70 shown in FIG. 34 was fabricated as follows. The color filter portions 63 were formed on the glass substrate 62 as in the case of the color filter substrate 60 in Example 11. Then, the thick overcoat layer 66 was formed over the substrate 62, covering the color filter portions 63. The surface of the overcoat layer 66 was polished so as to obtain the flat surface facing the liquid crystal. The transparent electrode 67 was formed over the overcoat layer 66 so as to complete the color filter substrate 70.

Figure 35:
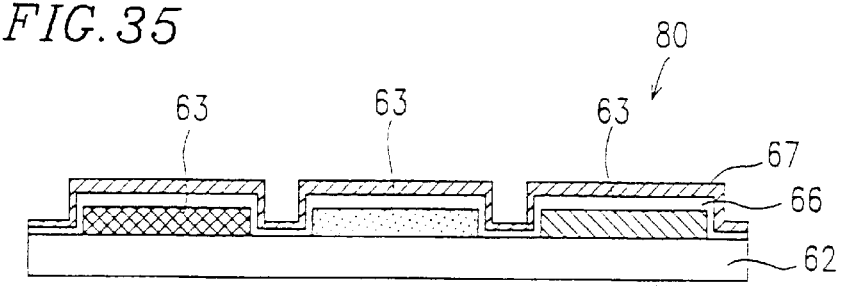
FIG. 35 is a sectional view of a conventional color filter of Comparative Example 4.

As Comparative Example 4, a color filter substrate 80 shown in FIG. 35 was fabricated as follows. The color filter substrate 80 has concave portions between the adjacent color filter portions 63.

First, as in the case of the color filter substrate 60, the color filter portions 63 were formed on the glass substrate 62. Then, the thin overcoat layer 66 was formed over the substrate having the color filter portions 63 without filling the spaces between the adjacent color filter portions 63 with a resist. Since the overcoat layer 66 is thin, concave portions were formed between the color filter portions 63. The transparent electrode 67 was formed over the overcoat layer 66 so as to complete the color filter substrate 80.

On the other hand, a substrate having TFTs (TFT substrate) was prepared and a resist wall made of a resist material (OMR 83, manufactured by Tokyo Ohka Kogyo Co., Ltd.) was formed around each pixel on the TFT substrate. Beads for realizing a uniform cell thickness were included in the resist wall in such a manner that these beads were not exposed outside the resist wall.

Liquid crystal cells of Example 11 and Comparative Examples 3 and 4 were fabricated using the color filter substrates 60, 70, and 80 and the TFT substrate described above, respectively.

In order to obtain a mixture of an ultraviolet-curable resin and liquid crystal, 0.1 g of R-684 (manufactured by Nippon Kayaku Co., Ltd.), 0.1 g of p-phenylstyrene, 0.06 g of a compound having formula (A) above, 3.74 g of ZLI-4792 (manufactured by Merck; containing 0.4% by weight of S-811) as the liquid crystal material, and 0.02 g of Irgacure 651 as the photopolymerization initiator were mixed. The resultant mixture was injected into the cell.

The cell was kept at 100° C. so as to maintain the miscible state of the mixture. Then, the cell was cooled to cause the phase separation of the mixture. The cell was heated again after the phase-separated liquid crystal phase had expanded to the entire pixel. A voltage of an effective value of 5 V, 60 Hz was applied between electrodes of the cell when the liquid crystal region had expanded to about one-fourth of the size of the pixel. The voltage was then gradually decreased. As a result, the liquid crystal molecules in the liquid crystal region were aligned axial-symmetrically.

Figure 36A:
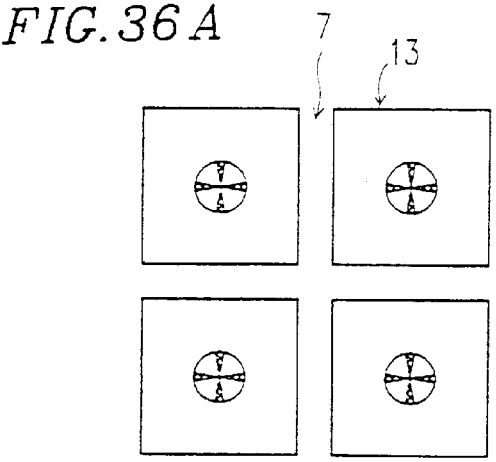
FIGS. 36A to 36C schematically show the position of the formation of a liquid crystal region in the fabrication process of the liquid crystal cells of Example 11 and Comparative Examples 3 and 4.
Figure 36B:
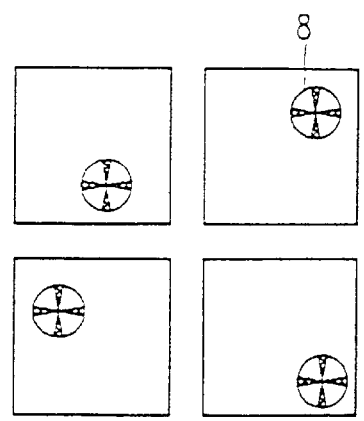
Figure 36C:
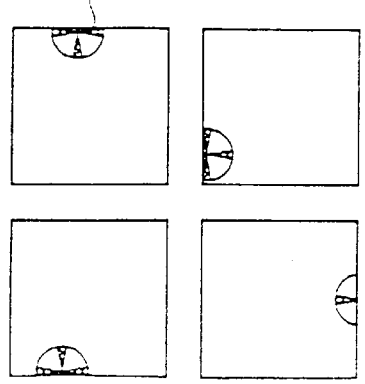

FIGS. 36A to 36C show how the liquid crystal phase is separated from the curable resin in Example 11 and Comparative Examples 3 and 4, respectively. The liquid crystal region tends to be formed at a portion having a large cell thickness. Accordingly, in Example 11, the liquid crystal region is formed at the center of the pixel as shown in FIG. 36A. On the other hand, in Comparative Example 3, the position where the liquid crystal region is formed is not fixed but varies among pixels as shown in FIG. 36B. In Comparative Example 4, the liquid crystal region tends to be formed outside the pixel partially extending inside the pixel as shown in FIG. 36C.

Thereafter, the cell was cooled to room temperature, and was irradiated with ultraviolet light of an intensity of 2 $mW/cm^2$ from a high-pressure mercury lamp from the side of the TFT substrate for 30 minutes, so as to cure the curable resin.

Figure 37A:
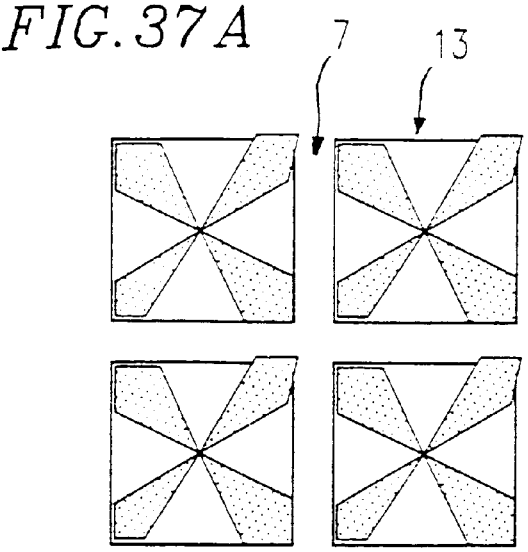
FIGS. 37A to 37C show diagrams of the liquid crystal cells of Example 11 and Comparative Examples 3 and 4 observed with the polarizing microscope.
Figure 37B:
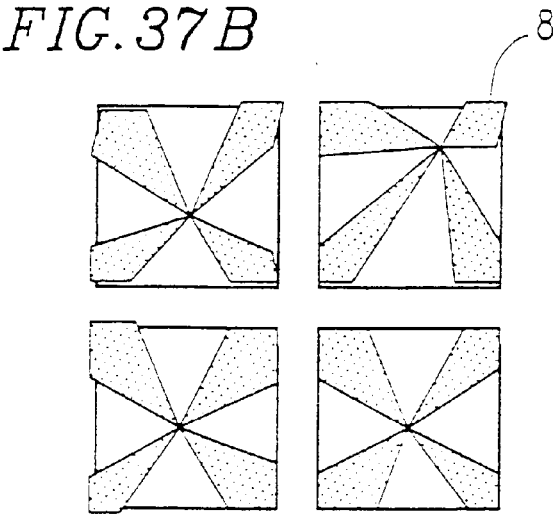
Figure 37C:
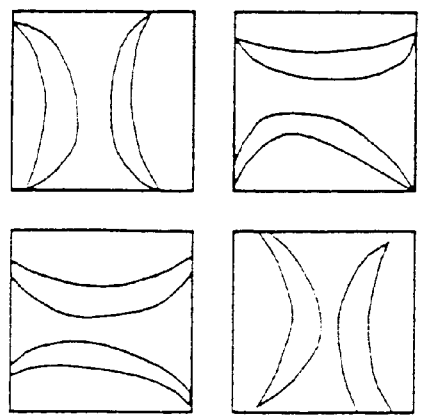

FIGS. 37A to 37C show the results of the cell viewed with the polarizing microscope. In Example 11, the position of the symmetry axis for the alignment of liquid crystal molecules are at the center of each pixel as shown in FIG. 37A for all the pixels. In Comparative Example 3, the symmetry axis for the alignment of liquid crystal molecules was greatly displaced as shown in FIG. 37B for several percent of pixels. As a result, in Example 11, no roughness of display was observed and a good display quality was obtained. In Comparative Example 3, however, the roughness of display was observed at the gray scale level and at a low viewing angle. In Comparative Example 4, since liquid crystal molecules were aligned axial-symmetrically in only about 30% of pixels, a badly roughened display was observed.

According to this example, a liquid crystal display device is provided with a color filter having concave portions each corresponding to a pixel. The liquid crystal molecules are aligned axial-symmetrically having the center portion of each pixel as the symmetry axis. Thus, the position of the axis for the axial-symmetric orientation of the liquid crystal molecules in each pixel can be definitely determined, the roughness of display observed when the viewing angle is changed can be minimized, and a liquid crystal device with a wide viewing angle providing uniform and high-contrast images can be realized. Moreover, the color filter portions according to the present invention can be fabricated in the same process as that for normal color filter portions. This provides a good cost performance.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for fabricating a liquid crystal device, comprising the steps of:

fabricating a cell by forming a first wall on at least one of a pair of electrode substrates, forming at least one of a concave portion and a convex portion at a center portion of a region surrounded by the first wall or forming an alignment film having at least one of a concave portion and a convex portion at the center portion of the region surrounded by the first wall, and then disposing the pair of electrode substrates to oppose each other;

injecting a mixture of at least liquid crystal and a curable resin into the cell; and phase-separating the liquid crystal from the curable resin by first heating the mixture to a homogeneously miscible temperature of the mixture and then gradually cooling the mixture, and curing the curable resin to form a polymer wall on the first wall.

2. A method for fabricating a liquid crystal device according to claim 1, wherein the curable resin is cured while at least one of a voltage and a magnetic field is applied to the cell.

3. A method for fabricating a liquid crystal device according to claim 2, wherein active driving elements for driving the liquid crystal by applying a voltage to electrodes of the electrode substrates are formed on one of the pair of electrode substrates, and a gate driving signal voltage applied to the active driving elements at the curing of the curable resin is synchronous with a source driving signal voltage applied to the active driving elements, and a pulse width of the gate driving signal voltage is a half or less of a cycle of the source driving signal voltage.

4. The method for fabricating a liquid crystal device according to claim 1, wherein a height H of the first wall and a height h of the convex portion have a relation of H>h.

5. A method for fabricating a liquid crystal device, comprising the steps of:

fabricating a cell by forming a first wall on at least one of a pair of electrode substrates, forming an alignment film having axial-symmetric orientation axes by phase-separating a mixed material containing two or more different types of polymer materials in a region surrounded by the first wall, and then disposing the pair of electrode substrates to oppose each other;

injecting a mixture of at least liquid crystal and a curable resin into the cell; and phase-separating the liquid crystal from the curable resin by first heating the mixture to a homogeneously miscible temperature of the mixture and then gradually cooling the mixture, and curing the curable resin to form a polymer wall on the first wall.

6. A method for fabricating a liquid crystal device according to claim 5, wherein the curable resin is cured while at least one of a voltage and a magnetic field is applied to the cell.

7. A method for fabricating a liquid crystal device according to claim 6, wherein active driving elements for driving the liquid crystal by applying a voltage to electrodes of the electrode substrates are formed on one of the pair of electrode substrates, and a gate driving signal voltage applied to the active driving elements at the curing of the curable resin is synchronous with a source driving signal voltage applied to the active driving elements, and a pulse width of the gate driving signal voltage is a half or less of a cycle of the source driving signal voltage.

* * * * *